US012610141B2

(12) United States Patent
Tang et al.

(10) Patent No.: US 12,610,141 B2
(45) Date of Patent: Apr. 21, 2026

(54) ELECTRONIC IMAGE STABILIZATION FOR LARGE ZOOM RATIO LENS

(71) Applicant: Ambarella International LP, Santa Clara, CA (US)

(72) Inventors: Jian Tang, Shanghai (CN); Xin Gao, Shanghai (CN)

(73) Assignee: Ambarella International LP, Santa Clara, FL (US)

( * ) Notice: Subject to any disclaimer, the term of this patent is extended or adjusted under 35 U.S.C. 154(b) by 219 days.

(21) Appl. No.: 18/602,416

(22) Filed: Mar. 12, 2024

(65) Prior Publication Data

US 2025/0280197 A1     Sep. 4, 2025

(30) Foreign Application Priority Data

Feb. 29, 2024     (CN) ......................... 202410234491.X

(51) Int. Cl.
H04N 23/68     (2023.01)

(52) U.S. Cl.
CPC ....... H04N 23/683 (2023.01); H04N 23/6811 (2023.01); H04N 23/6812 (2023.01)

(58) Field of Classification Search
None
See application file for complete search history.

(56) References Cited

U.S. PATENT DOCUMENTS

| | | | | |
|---|---|---|---|---|
| 11,743,450 B1* | 8/2023 | Tang | ................ | H04N 17/002 |
| | | | | 348/175 |
| 2010/0245603 A1* | 9/2010 | Hashi | ................ | H04N 23/685 |
| | | | | 348/208.5 |
| 2020/0412954 A1* | 12/2020 | Gaizman | ............ | H04N 23/6812 |
| 2021/0218894 A1* | 7/2021 | Stec | ................ | H04N 23/683 |

FOREIGN PATENT DOCUMENTS

| | | | | |
|---|---|---|---|---|
| CN | 102457752 B | * | 1/2016 | ......... H04N 23/6812 |
| CN | 116157728 A | * | 5/2023 | ......... H04N 23/6812 |

OTHER PUBLICATIONS

English translation of CN-102457752-B, Okada, 2016 (Year: 2016).*
English translation of CN-116157728-A, Tanaka, 2023 (Year: 2016).*

* cited by examiner

*Primary Examiner* — James M Hannett
(74) *Attorney, Agent, or Firm* — Maiorana Patent Law, PA

(57)     ABSTRACT

An apparatus comprising an interface and a processor. The interface may be configured to receive pixel data of an environment and movement information about the apparatus. The processor may be configured to process the pixel data arranged as video frames, implement an image stabilization compensation in response to a lens projection function and the movement information, perform an extra compensation in response to calibration values, and generate stabilized video frames in response to the image stabilization compensation, the extra compensation and the video frames. The calibration values may be determined in response to a pixel shift, the movement information, an image center distance, and an optical zoom ratio of a lens.

19 Claims, 12 Drawing Sheets

280

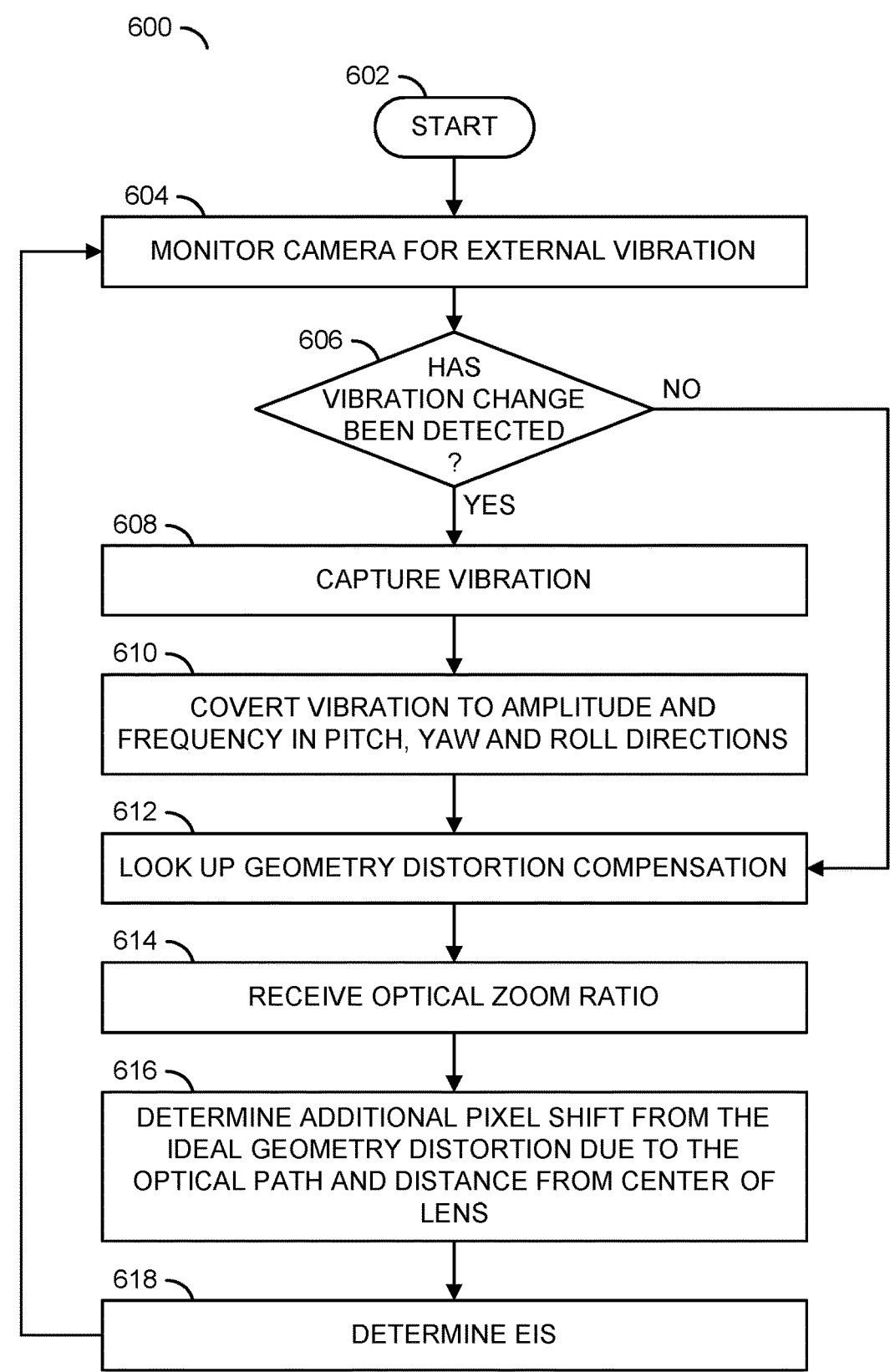

600

602
START

604
MONITOR CAMERA FOR EXTERNAL VIBRATION

606
HAS VIBRATION CHANGE BEEN DETECTED ?          NO

YES

608
CAPTURE VIBRATION

610
COVERT VIBRATION TO AMPLITUDE AND FREQUENCY IN PITCH, YAW AND ROLL DIRECTIONS

612
LOOK UP GEOMETRY DISTORTION COMPENSATION

614
RECEIVE OPTICAL ZOOM RATIO

616
DETERMINE ADDITIONAL PIXEL SHIFT FROM THE IDEAL GEOMETRY DISTORTION DUE TO THE OPTICAL PATH AND DISTANCE FROM CENTER OF LENS

618
DETERMINE EIS

FIG. 13

ELECTRONIC IMAGE STABILIZATION FOR LARGE ZOOM RATIO LENS

This application relates to China Application No. 202410234491.X, filed on Feb. 29, 2024. The mentioned application is hereby incorporated by reference in its entirety.

FIELD OF THE INVENTION

The invention relates to video capture generally and, more particularly, to a method and/or apparatus for implementing electronic image stabilization for large zoom ratio lens.

BACKGROUND

Electronic image stabilization (EIS) is an important aspect in internet protocol (IP) cameras and other types of cameras. EIS is a highly sophisticated system that involves digital signal processing (DSP) working at a frame-accurate level. Conventional image stabilization techniques do not perform well when the optical zoom reaches high levels (i.e., 10× to 40×). Generally, the image stabilization performs worse as the optical zoom ratio increases.

Conventional image stabilization techniques rely on digital image stabilization (DIS) using pure image processing for lenses with large optical zoom. Without an inertial measurement unit (IMU), DIS has no capability of distinguishing between whether there is external vibration or a relatively large object moving across the field of view. There are other such corner cases where DIS cannot provide acceptable levels of image stabilization.

It would be desirable to implement electronic image stabilization for large zoom ratio lens.

SUMMARY

The invention concerns an apparatus comprising an interface and a processor. The interface may be configured to receive pixel data of an environment and movement information about the apparatus. The processor may be configured to process the pixel data arranged as video frames, implement an image stabilization compensation in response to a lens projection function and the movement information, perform an extra compensation in response to calibration values, and generate stabilized video frames in response to the image stabilization compensation, the extra compensation and the video frames. The calibration values may be determined in response to a pixel shift, the movement information, an image center distance, and an optical zoom ratio of a lens.

BRIEF DESCRIPTION OF THE FIGURES

Embodiments of the invention will be apparent from the following detailed description and the appended claims and drawings.

FIG. 13 is a flow diagram illustrating a method for determining movement information for image stabilization compensation and extra compensation.

DETAILED DESCRIPTION OF THE EMBODIMENTS

Figure 1:
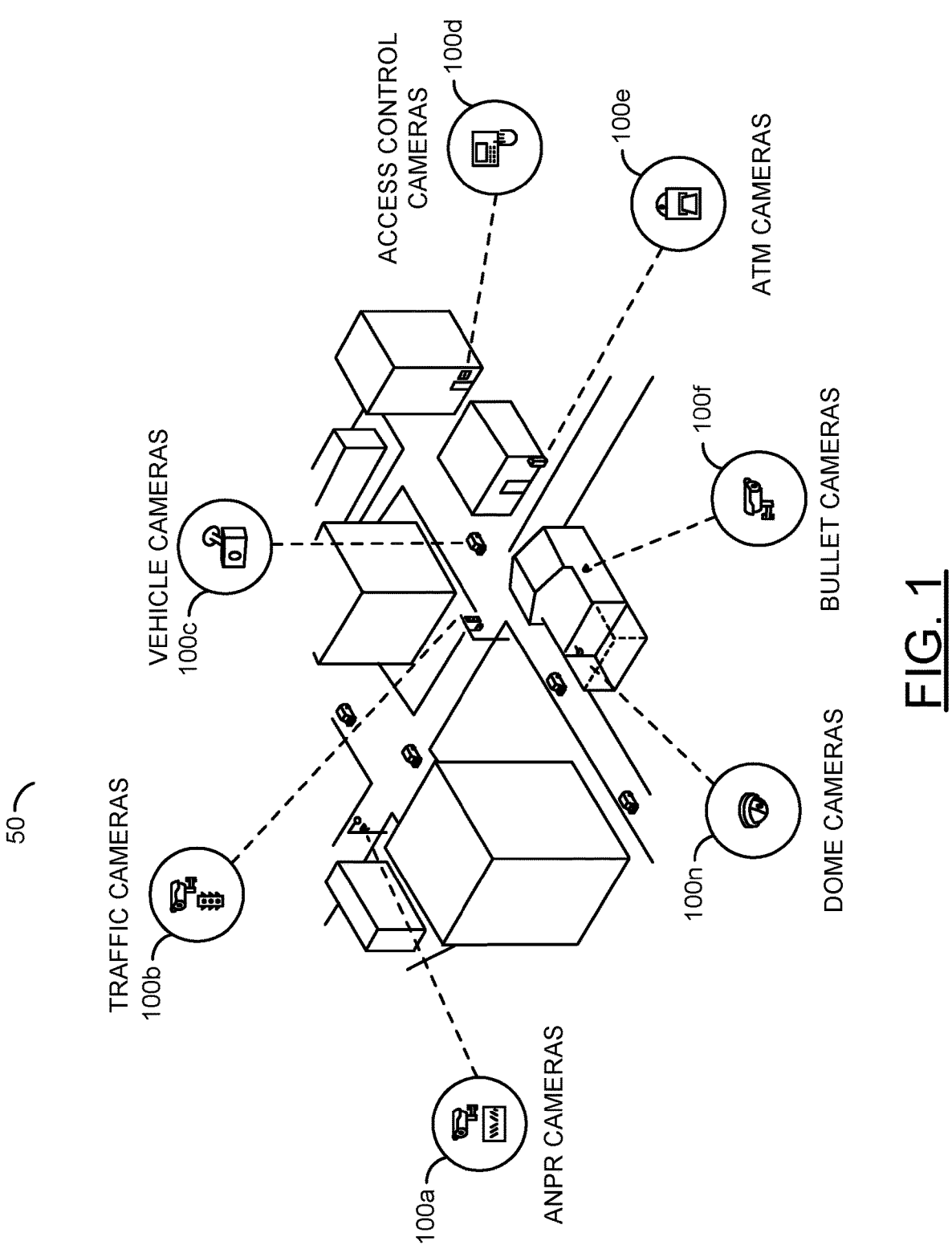
FIG. 1 is a diagram illustrating examples of internet protocol cameras that may utilize a processor configured to implement electronic image stabilization for large zoom ratio lens in accordance with example embodiments of the invention.

Embodiments of the present invention may include providing electronic image stabilization for large zoom ratio lens that may (i) utilize an inertial measurement unit, the image sensor and digital signal processing at a frame-accurate level, (ii) provide image stabilization at large zoom ratios at which pure digital image stabilization alone does not provide accurate results, (iii) cover all corner cases where digital image stabilization fails, (iv) operate similar to optical image stabilization, (v) utilize a vibration frequency and amplitude from an inertial measurement unit, (vi) implement a lens projection model, (vii) provide extra compensation with an increasing weight as the optical zoom ratio increases (viii) determine calibration values based on movement information, a pixel shift, an image center distance, and an optical zoom ratio of a lens and/or (ix) be implemented as one or more integrated circuits.

Embodiments of the present invention may be configured to perform electronic image stabilization (EIS) for a camera while capturing video data. In one example, the camera may be an internet protocol (IP) camera. In another example, the camera may be a handheld camera. The EIS may be a sophisticated system that combines various data sources to generate stabilized video frames in response to captured pixel data. The various data sources may comprise data from an inertial measurement unit (IMU), an image sensor, and digital signal processing (DSP) in a frame-accurate level.

An inertial measurement unit (IMU) may be implemented to determine the movement information. For example, a gyroscope may be configured to capture a movement of the IP camera while video frames are being captured, and the IMU may convert the movement into movement information. The movement information may be one source of data that may be used to perform the EIS.

The EIS may be performed using techniques that determine an appropriate amount of correction that takes into account a lens projection model and movement information. Extra compensation may be performed to deliver a state-of-the-art image stabilization result. In one example, image stabilization using a lens projection model and movement information alone (e.g., a solution that purely uses digital image stabilization) may not perform well when an optical zoom ratio becomes larger (e.g., from approximately 10× to 40× or larger). In another example, solutions that use only digital image stabilization may not be capable of distinguishing between external vibrations and a large object moving across a field of view of the camera. The extra compensation may be configured to provide accurate image stabilization at the large optical zoom ratio. The extra compensation may be configured to provide accurate image stabilization in various corner cases where digital image stabilization alone is incapable of providing accurate results. The combination of the image stabilization using a lens projection model and movement information with the extra stabilization may operate similar to optical image stabilization (OIS). The EIS performed may be compatible with IP cameras that implement computer vision and/or IP cameras that do not implement computer vision.

In some embodiments, the external vibration compensation may partially depend on the lens projection model. In one example, when the effective focal length (EFL) is relatively small (e.g., a relatively small EFL that may be less than approximately 50 mm), the compensation (e.g., image stabilization) may be largely dependent on the lens projection model. For example, the lens projection model may be one of Equidistant (e.g., f-theta), Stereographic (e.g., tailored distortion), a pin-hole model, etc. In some embodiments, results of the lens projection model may be stored in a look-up table. In another example, when the EFL is relatively large (e.g., a relatively large EFL that may be greater than approximately 50 mm), the extra compensation may provide a higher proportion of the image stabilization compared to the lens projection function. For example, the extra compensation may be determined independent from the lens projection function. Generally, the larger the optical zoom ratio, the more weight (e.g., the higher proportion of contribution to the total amount of compensation for image stabilization) from the extra compensation may be applied.

Embodiments of the present invention may be configured to determine EIS comprising at least two types of compensation. A first amount (e.g., contribution) to the compensation may be determined as a function of a lens geometry distortion projection and the movement information. The second amount (e.g., contribution) to the compensation may be determined as a function of various calibration values. Each of the two types of compensation may apply to all zoom ratios. However, the first amount of contribution (e.g., using the lens geometry distortion projection and movement information) may have a higher weight at lower optical zoom ratios and the second amount of contribution may have a higher weight at higher optical zoom ratios. For example, the amount of compensation from each type of compensation may be a variable ratio and the ratio may be different at the different zoom values and different distances.

The lens geometry distortion may be determined according to various lens optical projection functions (e.g., designs). In some embodiments, a processor may be configured to calculate the lens optical projection function. In some embodiments, a look-up table may be implemented to describe the geometry distortion compensation for the lens optical projection at different angles and/or distances from a point to a lens center. The movement information may comprise a vibration pattern. The vibration pattern may comprise a vibration frequency and a vibration amplitude in each rotation direction (e.g., pitch, yaw and roll).

The extra compensation may be determined from the intrinsic behavior and/or properties of the lens and/or the movement information. The calibration values may be determined based on a zoom value, a pixel shift, a distance from a point to the center of the lens and/or the movement information. The pixel shift may comprise an additional pixel shift from the ideal geometry distortion projection due to an optical path from zoom impact. The amount of contribution of each calibration value may be varied according to the design criteria of a particular implementation.

Referring to FIG. 1, a diagram illustrating examples of internet protocol cameras that may utilize a processor configured to implement electronic image stabilization for large zoom ratio lens in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. In another example, security (surveillance) applications and/or location monitoring applications (e.g., trail cameras) may benefit from a large amount of optical zoom. The design, type and/or application performed by the edge devices 100a-100n may be varied according to the design criteria of a particular implementation.

Figure 2:
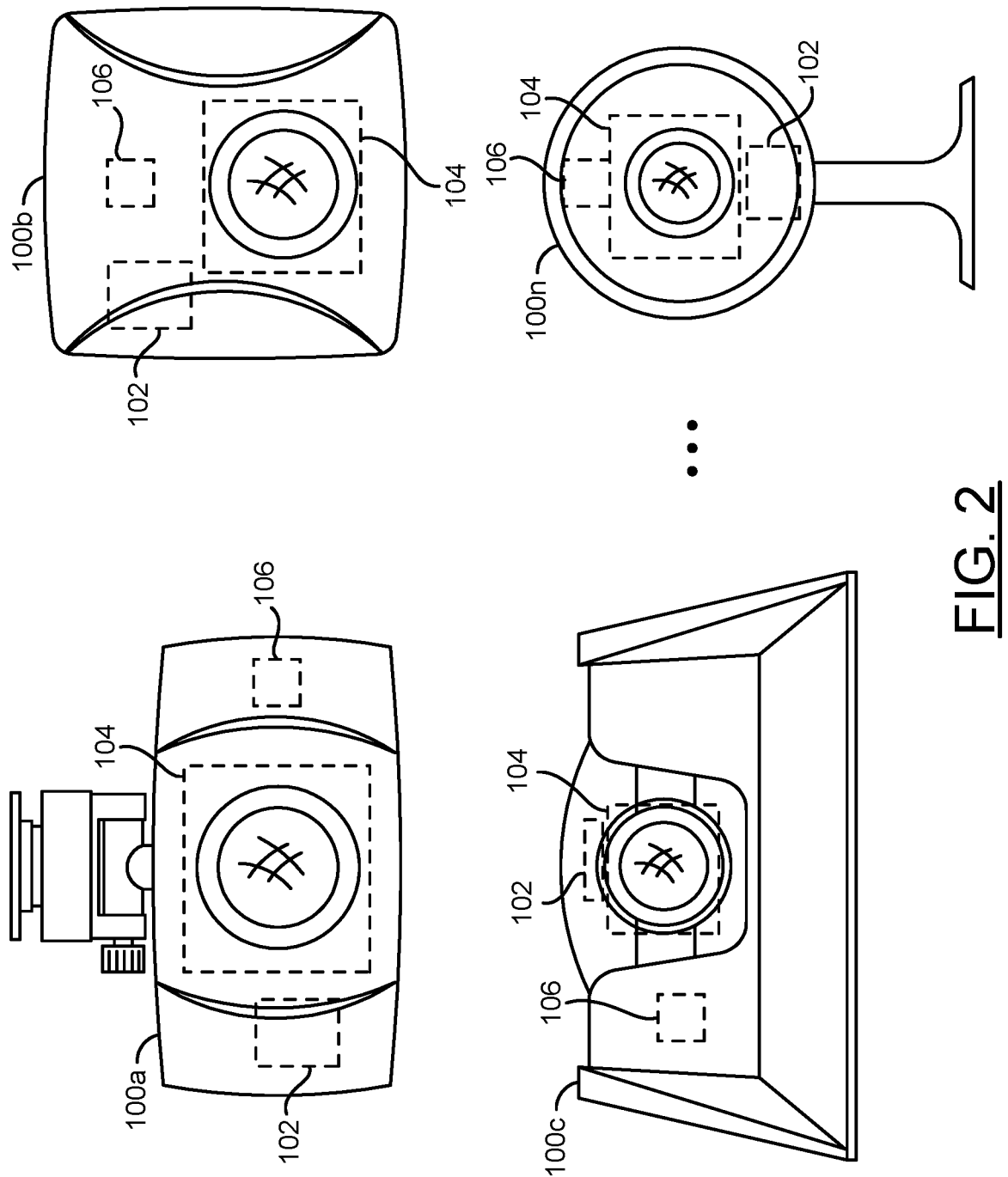
FIG. 2 is a diagram illustrating example cameras implementing an example embodiment of the present invention.

Referring to FIG. 2, a diagram illustrating example cameras implementing an example embodiment of the present invention is shown. The camera systems 100a-100n are shown. Each camera device 100a-100n may have a different style and/or use case. For example, the camera 100a may be an action camera, the camera 100b may be a ceiling mounted security camera, the camera 100n may be a webcam, etc. Other types of cameras may be implemented (e.g., home security cameras, battery powered cameras, doorbell cameras, stereo cameras, etc.). In some embodiments, the camera systems 100a-100n may be stationary cameras (e.g., installed and/or mounted at a single location). In some embodiments, the camera systems 100a-100n may be handheld cameras. In some embodiments, the camera systems 100a-100n may be configured to pan across an area, may be attached to a mount, a gimbal, a camera rig, etc. The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor. The circuit 104 may implement a capture device. The circuit 106 may implement an inertial measurement unit (IMU). The camera systems 100a-100n may comprise other components (not shown). Details of the components of the cameras 100a-100n may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The IMU 106 may be configured to generate movement data (e.g., vibration information, an amount of camera shake, panning direction, etc.). In some embodiments, a structured light projector may be implemented for projecting a speckle pattern onto the environment. The capture device 104 may capture the pixel data comprising a background image (e.g., the environment) with the speckle pattern. While each of the cameras 100a-100n are shown without implementing a structured light projector, some of the cameras 100a-100n may be implemented with a structured light projector (e.g., cameras that implement a sensor that capture IR light).

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding, electronic image stabilization and/or video transcoding on-device). For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other). For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
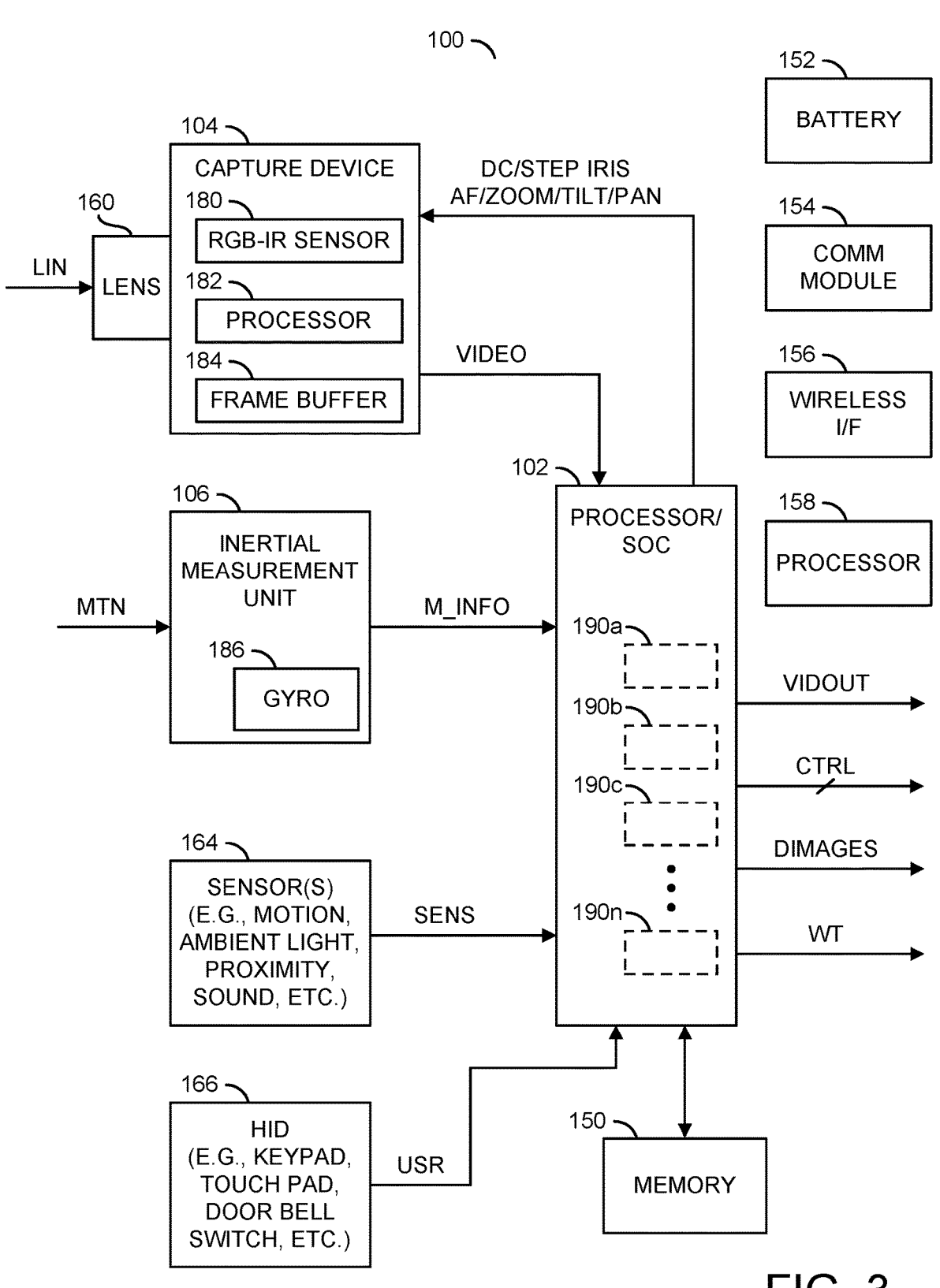
FIG. 3 is a block diagram illustrating a camera system.

Referring to FIG. 3, a block diagram illustrating a camera system is shown illustrating an example implementation. The camera system (or apparatus) 100 may be a representative example of the cameras 100a-100n shown in association with FIG. 2. The camera system 100 may comprise the processor/SoC 102, the capture device 104, and the IMU 106.

The camera system 100 may further comprise a block (or circuit) 150, a block (or circuit) 152, a block (or circuit) 154, a block (or circuit) 156, a block (or circuit) 158, a block (or circuit) 160, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The circuit 164 may implement one or more sensors. The circuit 166 may implement a human interface device (HID). In some embodiments, the camera system 100 may comprise the processor/SoC 102, the capture device 104, the IMU 106, the memory 150, the lens 160, the sensors 164, the battery 152, the communication module 154, the wireless interface 156 and the processor 158. In another example, the camera system 100 may comprise processor/SoC 102, the capture device 104, the IMU 106, the processor 158, the lens 160, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

In some embodiments, the processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be implemented as a dataflow vector processor. In an example, the processor 102 may comprise a highly parallel architecture configured to perform image/video processing and/or radar signal processing.

The memory 150 may store data. The memory 150 may implement various types of memory including, but not limited to, a cache, flash memory, memory card, random access memory (RAM), dynamic RAM (DRAM), etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets, radar data cubes, radar detections and/or metadata information. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. In yet another example, the memory 150 may store instructions to perform transformational operations (e.g., Discrete Cosine Transform, Discrete Fourier Transform, Fast Fourier Transform, etc.). The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a Display-Port interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics and/or radar signal processing to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). In some embodiments, the processor 158 may implement an integrated digital signal processor (IDSP). For example, the IDSP 158 may be configured to implement a warp engine. Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. In some embodiments, the signal VIDEO may be images comprising a background (e.g., objects and/or the environment captured) and the speckle pattern generated by a structured light projector. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, an event-based sensor, etc. For example, the image sensor 180 may be any type of sensor configured to provide sufficient output for computer vision operations to be performed on the output data (e.g., neural network-based detection). In the context of the embodiment shown, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The IMU 106 may be configured to detect motion and/or movement of the camera system 100. The IMU 106 is shown receiving a signal (e.g., MTN). The signal MTN may comprise a combination of forces acting on the camera system 100. The signal MTN may comprise movement, vibrations, shakiness, a panning direction, jerkiness, etc. The signal MTN may represent movement in three dimensional space (e.g., movement in an X direction, a Y direction and a Z direction). The type and/or amount of motion received by the IMU 106 may be varied according to the design criteria of a particular implementation.

The IMU 106 may comprise a block (or circuit) 186. The circuit 186 may implement a motion sensor. In one example, the motion sensor 186 may be a gyroscope. The gyroscope 186 may be configured to measure the amount of movement. For example, the gyroscope 186 may be configured to detect an amount and/or direction of the movement of the signal MTN and convert the movement into electrical data. The IMU 106 may be configured to determine the amount of movement and/or the direction of movement measured by the gyroscope 186. The IMU 106 may convert the electrical data from the gyroscope 186 into a format readable by the processor 102. The IMU 106 may be configured to generate a signal (e.g., M_INFO). The signal M_INFO may comprise the measurement information in the format readable by the processor 102. The IMU 106 may present the signal M_INFO to the processor 102. The number, type and/or arrangement of the components of the IMU 106 and/or the number, type and/or functionality of the signals communicated by the IMU 106 may be varied according to the design criteria of a particular implementation.

The sensors 164 may implement a number of sensors including, but not limited to, motion sensors, ambient light sensors, proximity sensors (e.g., ultrasound, radar, passive infrared, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication. The HID 166 may present a signal (e.g., USR) to the processor 102. The signal USR may comprise the input received by the HID 166.

In embodiments of the camera system 100 that implement a structured light projector, the structured light projector may comprise a structured light pattern lens and/or a structured light source. The structured source may be configured to generate a structured light pattern signal (e.g., a speckle pattern) that may be projected onto an environment near the camera system 100. The structured light pattern may be captured by the capture device 104 as part of the light input LIN. The structured light pattern lens may be configured to enable structured light generated by a structured light source of the structured light projector to be emitted while protecting the structured light source. The structured light pattern lens may be configured to decompose the laser light pattern generated by the structured light source into a pattern array (e.g., a dense dot pattern array for a speckle pattern).

In an example, the structured light source may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source may implement a near infrared (NIR) light source. In various embodiments, the light source of the structured light source may be configured to emit light with a wavelength of approximately 940 nanometers (nm), which is not visible to the human eye. However, other wavelengths may be utilized. In an example, a wavelength in a range of approximately 800-1000 nm may be utilized.

The processor/SoC 102 may receive the signal VIDEO, the signal M_INFO, the signal SENS, and the signal USR. The processor/SoC 102 may generate one or more video output signals (e.g., VIDOUT), one or more control signals (e.g., CTRL), one or more depth data signals (e.g., DIMAGES) and/or one or more warp table data signals (e.g., WT) based on the signal VIDEO, the signal M_INFO, the signal SENS, the signal USR and/or other input. In some embodiments, the signals VIDOUT, DIMAGES, WT and CTRL may be generated based on analysis of the signal VIDEO and/or objects detected in the signal VIDEO. In some embodiments, the signals VIDOUT, DIMAGES, WT and CTRL may be generated based on analysis of the signal VIDEO, the movement information captured by the IMU 106 and/or the intrinsic properties of the lens 160 and/or the capture device 104.

In various embodiments, the processor/SoC 102 may be configured to perform one or more of feature extraction, object detection, object tracking, electronic image stabilization, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data, the warp table data signal WT and/or the depth data signal DIMAGES comprising disparity maps and depth maps from the signal VIDEO. The video output signal VIDOUT the warp table data signal WT and/or the depth data signal DIMAGES may be presented to the memory 150, the communications module 154, and/or the wireless interface 156. In some embodiments, the video signal VIDOUT the warp table data signal WT and/or the depth data signal DIMAGES may be used internally by the processor 102 (e.g., not presented as output). In one example, the warp table data signal WT may be used by a warp engine implemented by a digital signal processor (e.g., the processor 158).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched, stabilized and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). Similarly other video processing and/or encoding operations (e.g., stabilization, compression, stitching, cropping, rolling shutter effect correction, etc.) may be performed by the processor 102 locally. For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, stabilized video frames, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the IMU 106, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. In some embodiments, other processors implemented by the apparatus 100 may be generic processors and/or video processors (e.g., a coprocessor that is physically a different chipset and/or silicon from the processor 102). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline, a radar signal processing pipeline and/or an AI processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15/593,493, filed on May 12, 2017 (now U.S. U.S. Pat. No. 10,437,600), U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/ model/year of a vehicle, identifying a person as a particular individual, detecting a type of animal, detecting characteristics of a face, etc.).

The CNN module 190*b* may be configured to implement convolutional neural network capabilities. The CNN module 190*b* may be configured to implement computer vision using deep learning techniques. The CNN module 190*b* may be configured to implement pattern and/or image recognition using a training process through multiple layers of feature-detection. The CNN module 190*b* may be configured to conduct inferences against a machine learning model.

The CNN module 190*b* may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190*b* to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190*b* using dedicated hardware circuitry may enable calculating descriptor matching distances in real time.

The CNN module 190*b* may be configured to perform face detection, face recognition and/or liveness judgment. For example, face detection, face recognition and/or liveness judgment may be performed based on a trained neural network implemented by the CNN module 190*b*. In some embodiments, the CNN module 190*b* may be configured to generate the depth image from the structured light pattern. The CNN module 190*b* may be configured to perform various detection and/or recognition operations and/or perform 3D recognition operations.

The CNN module 190*b* may be a dedicated hardware module configured to perform feature detection of the video frames. The features detected by the CNN module 190*b* may be used to calculate descriptors. The CNN module 190*b* may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190*b* as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 102. The CNN module 190*b* may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The CNN module 190*b* may implement the feature extraction and/or object detection by performing convolution operations. The convolution operations may be hardware accelerated for fast (e.g., real-time) calculations that may be performed while consuming low power. In some embodiments, the convolution operations performed by the CNN module 190*b* may be utilized for performing the computer vision operations. In some embodiments, the convolution operations performed by the CNN module 190*b* may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

One or more of the hardware modules 190a-190n may be configured to implement other types of AI models. In one example, the hardware modules 190a-190n may be configured to implement an image-to-text AI model and/or a video-to-text AI model. In another example, the hardware modules 190a-190n may be configured to implement a Large Language Model (LLM). Implementing the AI model(s) using the hardware modules 190a-190n may provide AI acceleration that may enable complex AI tasks to be performed on an edge device such as the edge devices 100a-100n.

One of the hardware modules 190a-190n may be configured to perform the virtual aperture imaging. One of the hardware modules 190a-190n may be configured to perform transformation operations (e.g., FFT, DCT, DFT, etc.). The number, type and/or operations performed by the hardware modules 190a-190n may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogeneous processing resources (all circuits 190a-190n may have the same capabilities) or heterogeneous processing resources (two or more circuits 190a-190n may have different capabilities).

Figure 4:
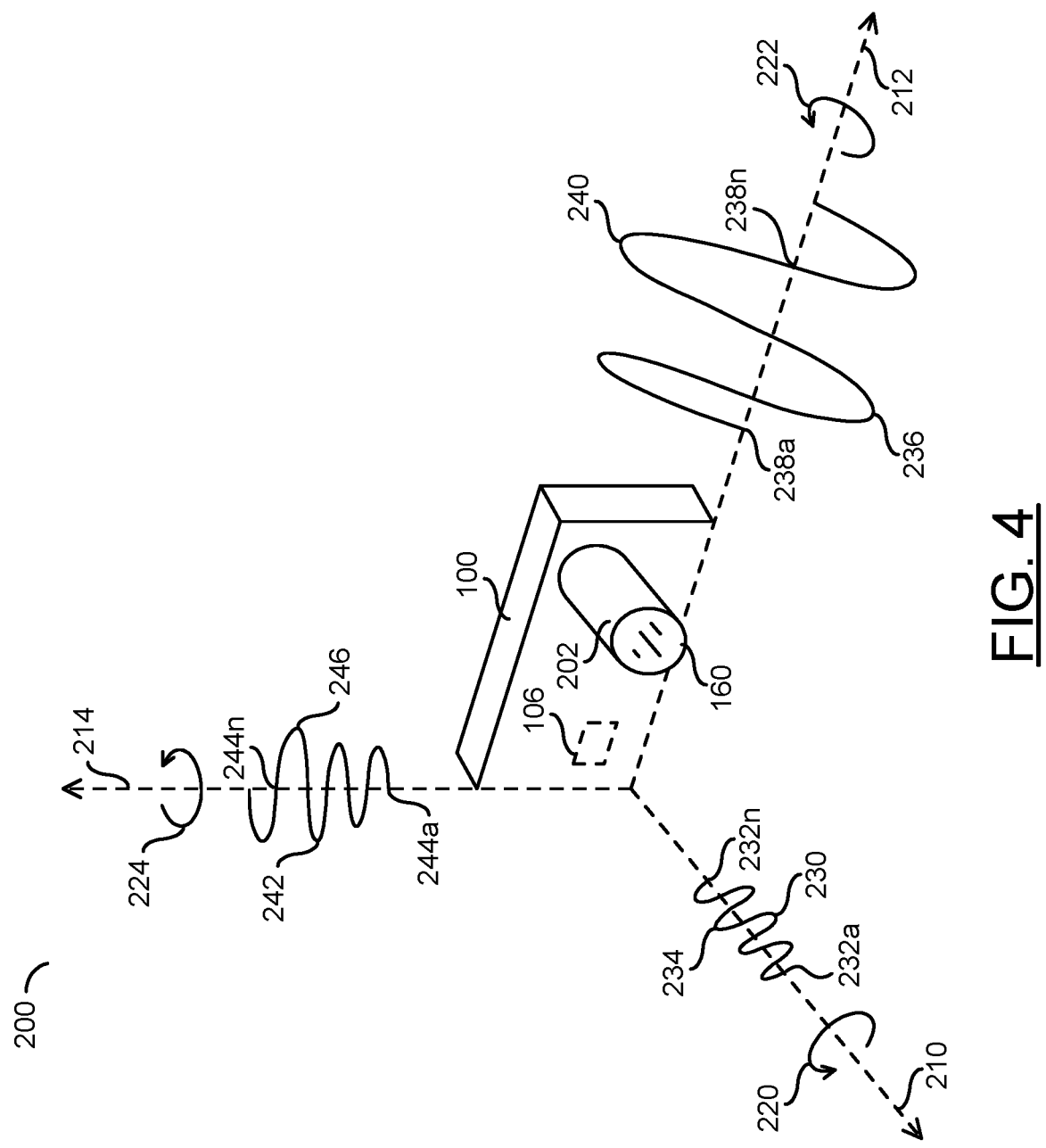
FIG. 4 is a diagram illustrating movement information.

Referring to FIG. 4, a diagram illustrating movement information is shown. A coordinate system 200 is shown. The camera system 100 is shown on the coordinate system 200. The IMU 106 and the lens 160 of the camera 100 are shown.

The camera system 100 may implement an optical zoom 202. For example, the lens 160 may provide an optical zoom 202. In some embodiments, the lens 160 may enable the optical zoom 202 and the processor 102 may further implement a digital zoom. The optical zoom 202 may enable the environment and/or objects captured to appear physically closer before the pixel data is captured. For example, the digital zoom may be a form of post-processing performed by the processor 102 and the optical zoom 202 may be a physical process performed by the lens 160 that may increase magnification. The optical zoom 202 may be implemented in response to moving parts within the camera lens 160. For example, the lens 160 may be adjusted in order to increase a focal length. Generally, the optical zoom 202 may enlarge a subject of the video frames while preserving image quality. In one example, the optical zoom 202 may be a 5× zoom. In another example, the optical zoom 202 may be a 10× zoom. In yet another example, the optical zoom 202 may be a 40× zoom. In some embodiments, the camera system 100 may implement a selectable optical zoom 202 in a range from 1× zoom to 83× zoom. The amount of the optical zoom 202 implemented may be varied according to the design criteria of a particular implementation.

The coordinate system 200 is shown as a dashed arrow 210, a dashed arrow 212 and a dashed arrow 214. The arrow 210 may represent an X-axis. The arrow 212 may represent a Y-axis. The arrow 214 may represent a Z-axis. The camera system 100 is shown at an origin of the coordinate system 200. Motion may be applied to the camera system 100, which may result in the motion MTN. For example, various amounts of force may be applied to the camera system 100 along the axes 210-214.

A curved arrow 220 is shown as a rotation around the X-axis 210. The curved arrow 220 may represent a roll rotation. A curved arrow 222 is shown as a rotation around the Y-axis 212. The curved arrow 222 may represent a pitch rotation. A curved arrow 224 is shown as a rotation around the Z-axis 214. The curved arrow 224 may represent a yaw rotation. The combination of motion MTN applied to the camera system 100 may cause the camera system 100 to have the roll rotation 220, the pitch rotation 222 and/or the yaw rotation 224. The IMU 106 may be configured to detect the various roll rotation 220, pitch rotation 222 and/or yaw rotation 224.

A curve 230 is shown on the X-axis 210. The curve 230 may represent a vibration on the X-axis 210. The vibration 230 may be one type of motion applied to the camera system 100 that may be measured by the IMU 106. The curve 230 is shown as a sinusoidal curve having a frequency 232a-232n and an amplitude 234. The frequency 232a-232n and the amplitude 234 may represent a component of the movement and/or vibration that results in the roll rotation 220.

A curve 236 is shown on the Y-axis 212. The curve 236 may represent a vibration on the Y-axis 212. The vibration 236 may be one type of motion applied to the camera system 100 that may be measured by the IMU 106. The curve 236 is shown as a sinusoidal curve having a frequency 238a-238n and an amplitude 240. The frequency 238a-238n and the amplitude 240 may represent a component of the movement and/or vibration that results in the pitch rotation 222.

A curve 242 is shown on the Z-axis 214. The curve 242 may represent a vibration on the Z-axis 214. The vibration 242 may be one type of motion applied to the camera system 100 that may be measured by the IMU 106. The curve 242 is shown as a sinusoidal curve having a frequency 244a-244n and an amplitude 246. The frequency 244a-244n and the amplitude 246 may represent a component of the movement and/or vibration that results in the yaw rotation 224.

The IMU 106 may convert the frequency 232a-232n and the amplitude 234 of the vibration 230 for the roll rotation 220, the frequency 238a-238n and the amplitude 240 of the vibration 236 for the pitch rotation 222 and/or the frequency 244a-244n and the amplitude 246 of the vibration 242 for the yaw rotation 224 to the motion information signal M_INFO. The vibrations 230-242 may result in motion (e.g., shakiness) in the captured pixel data VIDEO. The processor 102 may be configured to perform the compensation to counteract the motion to generate the stabilized video frames VIDOUT. Generally, as the amount of the optical zoom 202 increases, the more of an effect the vibrations 230-242 may have the amount of motion visible in the raw video data. For example, at large optical zoom levels (e.g., above 10×) even a small amount of movement may appear as a large amount of movement captured in the video frames.

Figure 5:
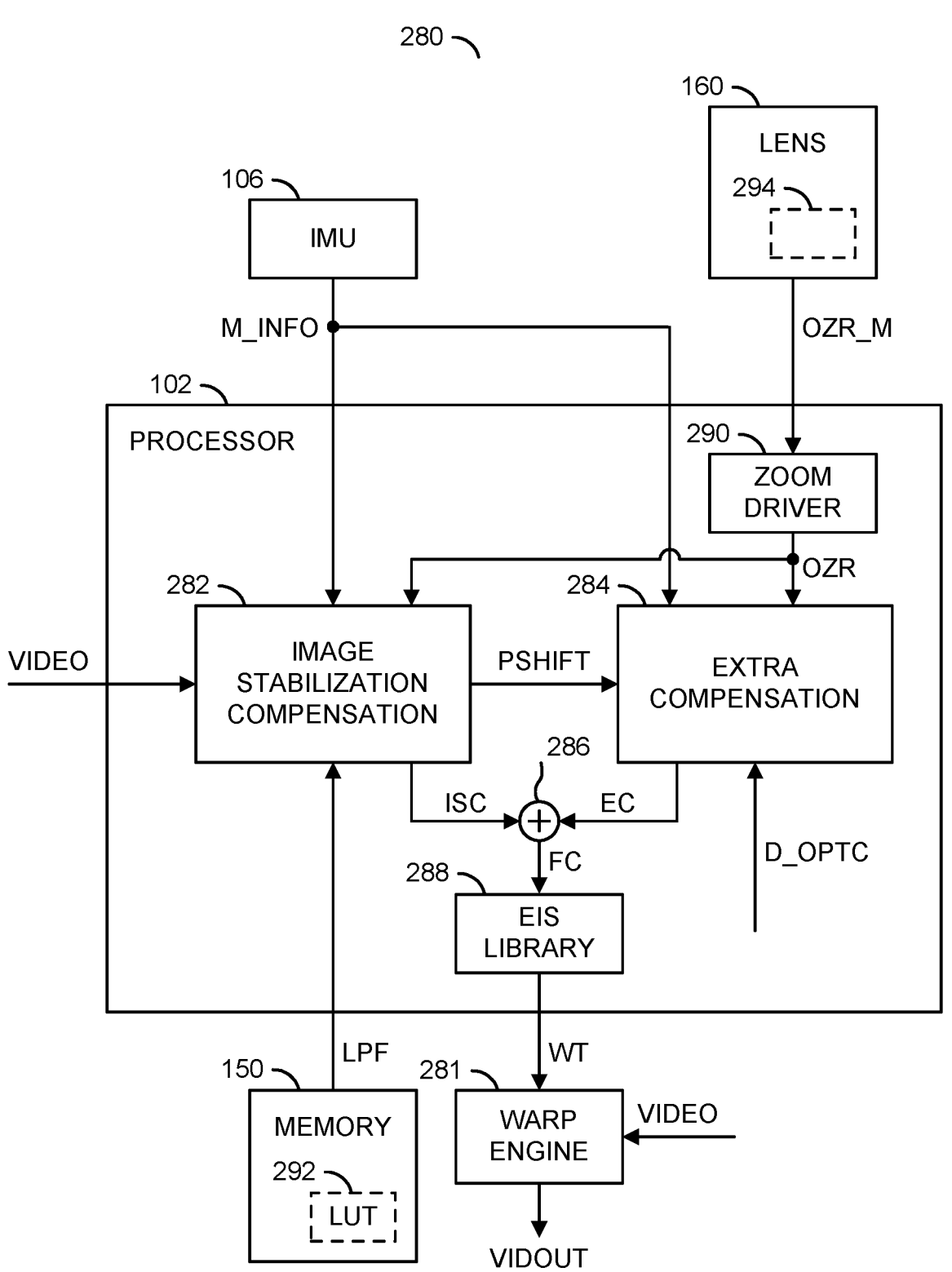
FIG. 5 is a block diagram illustrating electronic image stabilization for large zoom ratio lens.

Referring to FIG. 5, a block diagram illustrating electronic image stabilization for large zoom ratio lens is shown. Electronic image stabilization components 280 are shown. The electronic image stabilization components 280 may comprise the processor 102, the IMU 106, the memory 150, the lens 160 and/or a block (or circuit) 281. The circuit 281 may implement a warp engine. The electronic image stabilization components 280 may comprise additional components (not shown). The number, type and/or arrangement of the electronic image stabilization components 280 may be varied according to the design criteria of a particular implementation.

The processor 102 is shown receiving the pixel data (e.g., raw image data) signal VIDEO, the motion information signal M_INFO, a signal (e.g., OZR_M) and/or a signal (e.g., LPF). The signal VIDEO may be the pixel data arranged as video frames generated by the capture device 104 (not shown). The signal M_INFO may be the motion information generated by the IMU 106 in response to the motion MTN. The signal OZR_M may comprise an optical zoom reading from the lens 160. The signal LPF may be a lens projection function result provided by the memory 150. The processor 102 may generate the signal WT in response to a combination of the signal VIDEO, the signal M_INFO, the signal OZR_M and/or the signal LPF. The number, type and/or functionality of the signals received and/or generated by the processor 102 may be varied according to the design criteria of a particular implementation.

The processor 102 may comprise a block (or circuit) 282, a block (or circuit) 284, a block (or circuit) 286, a block (or circuit) 288 and/or a block (or circuit) 290. The circuit 282 may implement an image stabilization compensation module. The circuit 284 may implement an extra compensation module. The circuit 286 may implement an adder. The circuit 288 may implement an EIS library. The circuit 290 may implement a zoom driver. The circuits 282-290 may be implemented as one or more of the dedicated hardware modules 190a-190n described in association with FIG. 3. The processor 102 may comprise other components (not shown). The number, type and/or arrangement of the components of the processor 102 may be varied according to the design criteria of a particular implementation.

The image stabilization compensation module 282 may receive the signal VIDEO, the signal M_INFO, the signal LPF and/or a signal (e.g., OZR). The signal OZR may comprise the optical zoom ratio converted to an EFL (e.g., a pixel unit value). The image stabilization compensation module 282 may generate a signal (e.g., ISC) and/or a signal (e.g., PSHIFT). The signal ISC may be an image stabilization compensation. The signal PSHIFT may be a pixel shift (e.g., a pixel shift from the ideal geometry distortion projection due to the optical path from the zoom impact). The image compensation signal ISC and/or the signal PSHIFT may be generated in response to the signal VIDEO, the signal OZR, the signal M_INFO and/or the signal LPF. The signal ISC may be presented to the adder 286. The signal PSHIFT may be presented to the extra compensation module 284.

The image stabilization compensation module 282 may be configured to receive, implement and/or calculate a general lens projection function. In some embodiments, the image stabilization compensation module may implement dedicated hardware configured to perform operations that may calculate the results of the general lens projection function. In one example, the memory 150 may present the general lens projection function to the image stabilization compensation module 282. In the example shown, the memory 150 may comprise a block (or circuit) 292. The circuit 292 may comprise a lookup table. In an example, the lookup table 292 may present a value for the result of the lens projection function as the signal LPF.

The signal PSHIFT may comprise the amount of pixel shift. The amount of pixel shift may be determined based on the amount of distortion caused by the zoom and/or the shape of the lens 160. The pixel shift may be an additional pixel shift from the ideal geometry distortion projection that may result from the effect of the zoom on the optical path. The pixel shift may be a result of the shape of the lens 160 and/or a wide angle effect of the lens 160. The signal PSHIFT may be determined by the image stabilization compensation module 282.

The zoom driver 290 may be configured to determine the EFL in response to the optical zoom ratio 202. The zoom driver 290 may receive the optical zoom reading signal OZR_M. The zoom driver 290 may generate the optical zoom signal OZR in response to the optical zoom reading signal OZR_M. The lens 160 may comprise (or be connected to) a block (or circuit) 294. The circuit 294 may be a zoom lens motor. The zoom lens motor 294 may be configured to adjust the optical zoom ratio and/or the amount of optical zoom for the lens 160. In one example, the zoom lens motor 294 may be controlled by the processor 102 (e.g., as shown in association with FIG. 3). The zoom lens motor 294 may be configured to present the optical zoom reading signal OZR_M to the processor 102. The optical zoom reading signal OZR_M may comprise the change and/or the amount of the optical zoom ratio 202 for the lens 160. The zoom driver 290 may be a driver for the zoom lens motor 294. The zoom driver 290 may be used by the processor 102 for the EIS and/or other video processing features. The zoom driver 290 may be configured to receive the optical zoom reading signal OZR_M comprising the optical zoom ratio 202 and convert the optical zoom ratio 202 to the EFL. The EFL may comprise a pixel unit value. The zoom driver 290 may be configured to convert the optical zoom ratio 202 to the EFL in real-time. Determining the EFL in real-time may enable the image stabilization compensation module 282 and/or the extra compensation module 284 to react and/or be adjusted in response to the EFL in real-time. The signal OZR may be presented to the image stabilization compensation module 282 and the extra compensation module 284.

The extra compensation module 284 may receive the signal M_INFO, the signal OZR, the signal PSHIFT and/or the signal D_OPTC. The signal D_OPTC may comprise the distance from optical center of the lens 160. The distance from optical center of the lens 160 may be calculated by the processor 102 in real-time. Details of the distance from optical center may be described in association with FIGS. 9-10. The extra compensation module 284 may be configured to generate a signal (e.g., EC). The signal EC may be an extra compensation. The extra compensation signal EC may be generated in response to the signal M_INFO, the signal OZR, the signal D_OPTC and/or the signal PSHIFT. The signal EC may be presented to the adder 286.

The extra compensation signal EC may be generated in response to calibration values. The calibration values may be generated to perform calculations and/or determine an amount of weighting to apply to each of the movement information provided in the signal M_INFO, the optical zoom ratio (e.g., the EFL) in the signal OZR, the pixel shift provided in the signal PSHIFT and/or the distance from optical center provided in the signal D_OPTC. The calibration values may be determined by a calibration technique. The calibration technique may be implemented while the camera systems 100a-100n are off-line. For example, the calibration technique to determine the calibration values may be performed during a manufacturing process of the camera systems 100a-100n.

The signal ISC may comprise one portion of the electronic image stabilization performed by the processor 102. The signal EC may comprise another portion of the electronic stabilization performed by the processor 102. The amount of contribution to the overall electronic image stabilization performed by the processor 102 may be determined in response to the various input received by the image stabilization compensation module 282 and the extra compensation module 284. Generally, as the optical zoom ratio 202 increases, the greater the proportion of contribution by the extra compensation may be made to the electronic image stabilization compared to the image stabilization compensation.

The adder 286 may be configured to combine the data from the image stabilization compensation signal ISC and the extra compensation signal EC. The adder 286 may generate a signal (e.g., FC) in response to the signal ISC and the signal EC. The signal FC may comprise the full compensation (e.g., the total compensation). In some embodiments, the image stabilization compensation may be calculated independently from the extra compensation. For example, the adder 286 may be configured to add the contribution to the electronic image stabilization from the signal ISC and the contribution to the electronic image stabilization from the signal EC. In the example shown, the adder 286 may combine the amount of image stabilization from the image stabilization compensation module 282 and the extra compensation module 284 in order to generate the full compensation signal FC. The signal FC may be presented to the EIS library 288. In some embodiments, the image stabilization may be performed in stages. For example, the pixel data may be provided to the image stabilization compensation module 282 to provide the image stabilization compensation as a first stage for the EIS library 288, then the partially stabilized video frames may be presented to the extra compensation module 284 to enable the extra compensation module 284 to perform the extra compensation as a second stage for the EIS library 288, and then the EIS library 288 may present the signal WT.

The EIS library 288 may receive the signal FC. The EIS library 288 may run on the processor 102. The EIS library 288 may be configured to determine a warp table in response to the signal FC. For example, the EIS library 288 may determine a computation result in response to the signal FC to determine the warp table data signal WT. The EIS library 288 may comprise various techniques for correcting observational effects such as image distortion, rotation, and scaling. For example, the EIS library 288 may be configured to estimate warp fields from neighboring video frames, synthesize the stabilized frame by fusing the warped content and/or estimate local motion vectors in response to the metadata provided by the full compensation signal FC. In one example, the EIS library 288 may provide a lookup table for warp table data in response to the parameters (e.g., motion data and camera parameters) of the total compensation. The data stored in the EIS library 288 may be varied according to the design criteria of a particular implementation. The warp table data result WT may be presented to the warp engine 281.

The warp engine 281 may receive the signal VIDEO and/or the signal WT. The warp engine may generate the signal VIDOUT. In some embodiments, the warp engine 281 may be a component of the processor 102. In some embodiments, the warp engine 281 may be a dedicated hardware block inside an integrated digital signal processor (IDSP) 158. The warp engine 281 may be configured to apply the compensation from the warp table to the input raw video image (e.g., the signal VIDEO). The warp engine 281 may be configured to generate the output video frames VIDOUT.

In the example shown, the warp engine 281 may output the stabilized video frames VIDOUT. In some embodiments, the processor 102 (or the separate IDSP module 158) may comprise other components that may operate on the raw video data and/or the stabilized video data to perform other types of post-processing before the output video frames VIDOUT are generated. The particular sequence of operations performed in order to generate the stabilized video frames VIDOUT may be varied according to the design criteria of a particular implementation.

Figure 6:
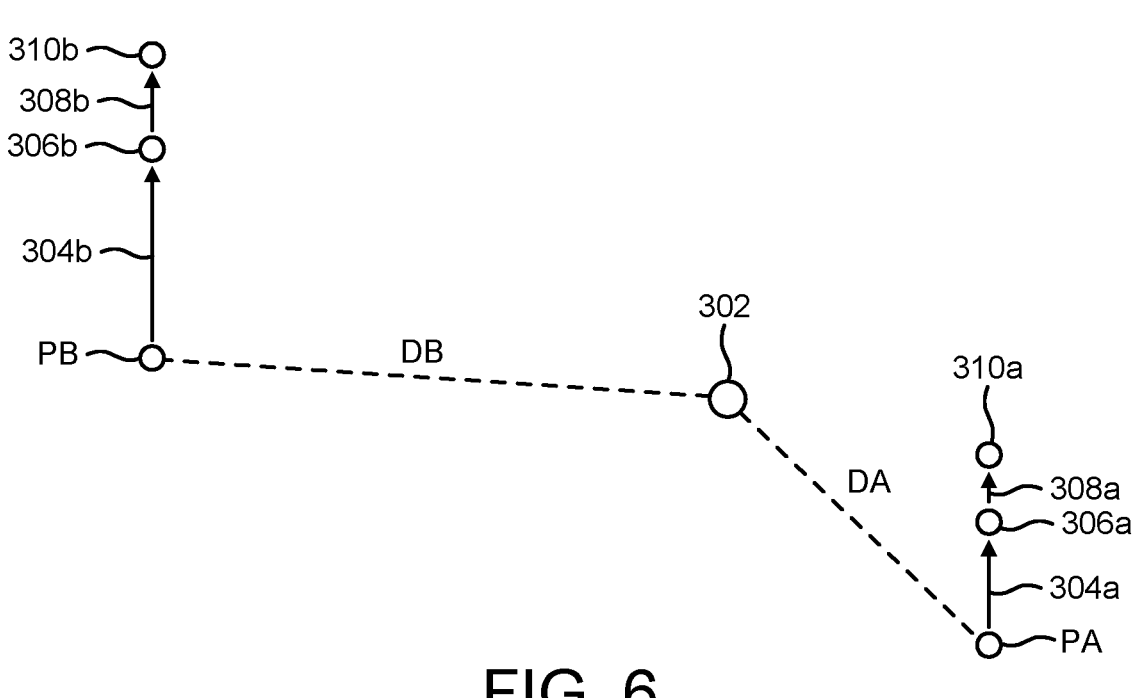
FIG. 6 is a diagram illustrating image stabilization compensation in response to a lens projection function and an extra compensation in response to an optical zoom ratio of the lens.

Referring to FIG. 6, a diagram illustrating image stabilization compensation in response to a lens projection function and an extra compensation in response to an optical zoom ratio of the lens is shown. A compensation diagram 300 is shown. The compensation diagram 300 may provide an illustrative example of an effect of distance from an optical center of the image sensor 180 on the amount of image stabilization that may be applied by the image stabilization compensation module 282 and the extra compensation module 284.

The compensation diagram 300 may comprise a point 302, a point (e.g., PA) and a point (e.g., PB). The point 302 may represent an optical center of the image sensor 180. The point PA may be a distance (e.g., DA) from the optical center 302. The point PB may be a distance (e.g., DB) from the optical center 302. In an example, the points PA and PB may represent pixel locations on the image sensor 180. The distance DB may be a greater distance (e.g., by absolute value) from the optical center 302 than the distance DA. In the example shown, the point PB may be farther away from the optical center 302 than the point PA.

The points PA-PB may each comprise respective arrows 304a-304b, points 306a-306b, arrows 308a-308b and points 310a-310b. The arrows 304a-304b may represent an amount of contribution to compensation implemented for the image stabilization compensation. The points 306a-306b may be compensation points. The compensation points 306a-306b may illustrate an amount of compensation performed by the image stabilization compensation module 282. The arrows 308a-308b may represent an amount of contribution to compensation implemented for the extra compensation. The points 310a-310b may be compensation points. The compensation points 310a-310b may illustrate an amount of compensation performed by the extra compensation module 284.

In an example, image stabilization performed without the electronic image stabilization for large zoom ratio lens may generate image stabilization with the image stabilization compensation contribution 304a-304b and without the extra compensation contribution 308a-308b (e.g., the overall image stabilization may be the compensation points 306a-306b). Implementing the camera systems 100a-100n with the extra compensation module 284 may enable the overall image stabilization to further comprise the extra compensation contribution 308a-308b. For example, in response to the image stabilization compensation contribution 304a-304b and the extra compensation contribution 308a-308b the overall image stabilization may be the compensation points 310a-310b. Generally, the ideal overall image stabilization result may be the compensation points 310a-310b (e.g., resulting from contribution by both the image stabilization contribution 304a-304b and the extra compensation contribution 308a-308b).

Generally, for the lens 160 implemented by the camera systems 100a-100n, the external vibration compensation may largely depend on the lens projection model. For embodiments with a small optical zoom 202, the compensation may be performed relatively accurately using the general lens projection function implemented by the image stabilization compensation module 282. In one example, a small optical zoom ratio may be less than approximately 10× zoom. In another example, the small optical zoom ratio may be when the EFL is less than 50 mm. The amount of optical zoom ratio and/or EFL that may be considered a small optical zoom may be varied according to the design criteria of a particular implementation.

The image stabilization compensation module 282 may implement one or more lens projection functions. In one example, the lens projection function may be an equidistant lens projection function (e.g., the f-theta model). The equidistance lens projection function may be determined according to an equation (e.g., EQ1):

$$c = f^* \Theta \qquad \text{EQ1:}$$

In another example, the lens projection function may be a stereographic lens projection function (e.g., the tailored distortion model). The stereographic lens projection function may be determined according to an equation (e.g., EQ2):

$$c = 2^* f^* \tan(\Theta/2) \qquad \text{EQ2:}$$

In yet another example, the lens projection function may be a pin hole lens projection function. The pin hole lens projection function may be determined according to an equation (e.g., EQ3):

$$c = f^* \tan(\Theta) \qquad \text{EQ3:}$$

In still another example, the lens projection function may be precalculated for various values of $\Theta$ and stored in the lookup table 292. The value of $\Theta$ may represent an incident angle for each pixel of image. The image stabilization compensation module 282 may determine the result of the lens projection function to provide the image stabilization compensation 304a-304b. For example, the result of the lens projection function may result in a compensation for the points PA-PB of the compensation points 306a-306b, respectively. The particular lens projection function implemented and/or method of determining a result of the lens projection function may be varied according to the design criteria of a particular implementation.

The extra compensation may be added to the image stabilization compensation for any amount of the optical zoom 202. Generally, for larger optical zooms, the amount of compensation may be outside of the bounds of the general lens projection function. For example, the larger the optical zoom 202 is, the more weight that is applied from the extra compensation EC. In one example, a large optical zoom ratio may be greater than approximately 10× zoom. In another example, the large optical zoom ratio may be when the EFL is greater than 50 mm. The amount of optical zoom ratio and/or EFL that may be considered a large optical zoom may be varied according to the design criteria of a particular implementation.

The points PA-PB may be an original point of a pixel without compensation. An accurate compensation coordinate for the points PA-PB may be at approximately the compensation points 310a-310b. The image stabilization compensation 304a-304b from the general lens projection function may still be a distance away from the compensation points 310a-310b (e.g., ideal compensation). The extra compensation contribution 308a-308b may provide extra padding. The extra compensation contribution 308a-308b may result in the overall compensation being at the compensation points 310a-310b. While the compensation points 310a-310b are shown for two of the pixel points PA-PB, the processor 102 may be configured to determine the ideal compensation for each pixel in the video frames. For example, the image stabilization compensation ISC and the extra compensation EC may be calculated for each of the pixels in the raw image data.

In the example shown, the length of the arrow 304b for the image stabilization compensation of the point PB may be longer than the length of the arrow 304a for the image stabilization compensation for the point PA. Similarly, the length of the arrow 308b for the extra compensation of the point PB may be longer than the length of the arrow 308a for the extra compensation for the point PB. When PB is further away than PA, then an amount of compensation (e.g., rB) applied to the pixel PB may be greater than an amount of compensation (e.g., rA) applied to the pixel PA. When a point (e.g., PB) is located at a greater distance from the optical center 302 of the lens 1106 than another point (e.g., PA), then the value of the image stabilization compensation contribution 304b for the point PB may be greater than the image stabilization compensation contribution 304a for the point PA, and the value of the extra compensation contribution 308b for the point PB may be greater than the extra compensation contribution 308a for the point PA. In the example shown, the arrow 304b and the arrow 308b are shown proportionally larger than the arrow 304a and the arrow 308a.

Figure 7:
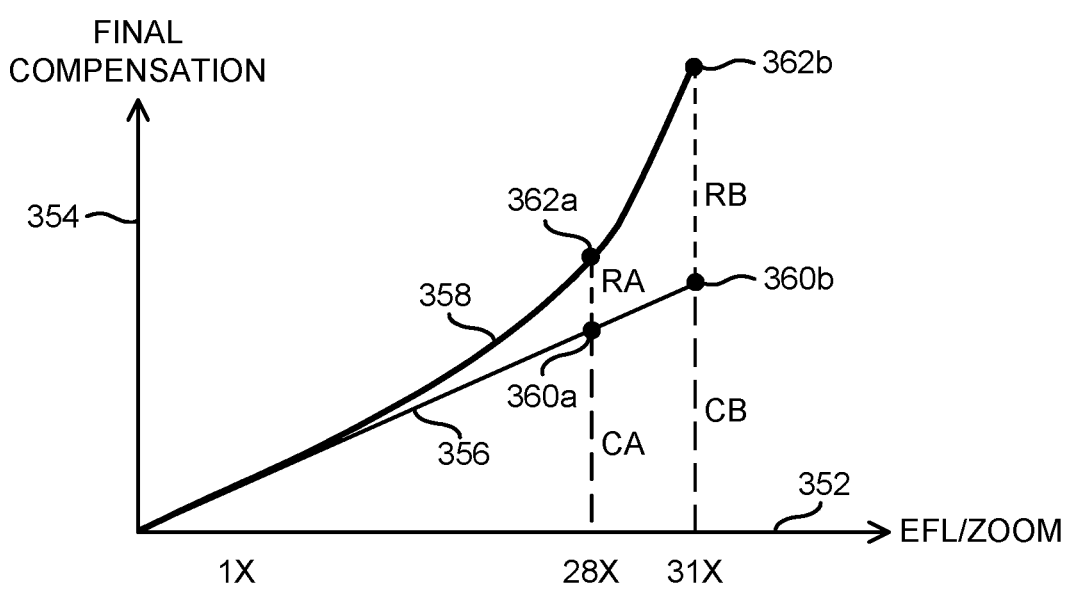
FIG. 7 is a diagram illustrating a graph of total compensation for a range of optical zoom ratios.

Referring to FIG. 7, a diagram illustrating a graph of total compensation for a range of optical zoom ratios is shown. A graph 350 is shown. The graph 350 may comprise an axis 352 and an axis 354. The axis 352 may be an X-axis. The X-axis 352 may illustrate an amount of EFL and/or zoom ratio. The axis 354 may be a Y-axis. The Y-axis 354 may represent an amount of final compensation (e.g., FC) for the image stabilization performed.

The graph 350 may comprise a curve 356 and a curve 358. The curve 356 may represent an amount of compensation performed in response to only the image stabilization compensation module 282. The image stabilization compensation curve 356 is generally shown as linear. For example, as the zoom ratio increases, the amount of the image stabilization compensation increases linearly. The linear increase of the image stabilization compensation may be insufficient to account for larger optical zoom levels.

The curve 358 may represent an amount of compensation performed in response to both the image stabilization compensation module 282 and the extra compensation module 284. The extra compensation curve 358 is generally shown as non-linear. For example, as the zoom ratio increases, the amount of the extra compensation may increase non-linearly. The non-linear increase of the extra compensation may accurately account for the distortion caused by larger optical zoom levels.

A point 360a and a point 360b are shown on the image stabilization compensation curve 356. The points 360a-360b may be an amount of compensation (e.g., CA-CB, respectively). The amount of compensation CA-CB may represent a contribution of the image stabilization compensation generated by the image stabilization compensation module 282. The amount of compensation CA and the point 360a may correspond to a zoom level of 28×. The amount of compensation CB and the point 360b may correspond to a zoom level of 31×. The amount of compensation CB may be a linear increase compared to the compensation CA that corresponds to the difference between the zoom level 31× and the zoom level 28×.

A point 362a and a point 362b are shown on the extra compensation curve 358 above the respective points 360a-360b. An amount of extra compensation RA is shown extending from the point 360a to the point 362a and an amount of extra compensation RB is shown extending from the point 360b to the point 362b. The amount of extra compensation RA-RB may represent a contribution of the extra compensation generated by the extra compensation module 284. The points 362a-362b may be an amount of total compensation (e.g., CA+RA and CB+RB, respectively). The amount of extra compensation RA and the point 362a may correspond to a zoom level of 28×. The amount of extra compensation RB and the point 362b may correspond to a zoom level 31×. The amount of extra compensation RB may be a non-linear increase compared to the amount of extra compensation RA that corresponds to the difference between the zoom level 31× and the zoom level 28×. The non-linear relationship between the increase in optical zoom and the amount of extra compensation may enable the final compensation to accurately compensate the distortion caused by larger optical zoom ratios.

The total amount of compensation may be represented by an equation (e.g., EQ4):

$$Final\_comp = R[k1*f(EFL,zoom),k2*radius,\ k3*frequency] \qquad \text{EQ4:}$$

The equation EQ4 for determining the total amount of compensation may be calculated by a combination of the image stabilization compensation module 282, the extra compensation module 284 and/or the adder 286. The value of f (EFL, zoom) may be determined in response to the signal OZR and/or the signal PSHIFT. The value of f (EFL, zoom) may correspond to the motion information and the general lens projection function. The frequency may be the external vibration frequency that may be generated in response to the analysis of the IMU 106. The values k1, k2 and k3 may be calibration values. A self-designed calibration may be implemented to determine the calibration values. The calibration values k1, k2 and k3 may be scalar values. In one example, the calibration value k1 may be a scalar value for the pixel shift and the optical zoom, the calibration value k2 may be a scalar value for the image center distance, and the calibration value k3 may be a scalar value for the movement information.

The EIS implemented by the processor 102 may comprise contributions from two components (e.g., the image stabilization compensation ISC and the extra compensation EC). The image stabilization compensation (e.g., c) may be a function of the lens geometry distortion projection (e.g., the signal LPF) and/or a vibration pattern (e.g., the motion information in the signal M_INFO). The lens geometry distortion may be determined from various different lens optical projection designs. For example, various lens optical projection designs are shown in EQ1-EQ3. Other lens optical projections designs may be implemented (e.g., c=2*sin (Θ/2)). Other more complicated lens optical projection designs may be implemented. For example, the look-up table 292 may be implemented to describe the geometry distortion compensation for the lens optical projection at different angles and/or distances from the point (e.g., the point PA, the point PB, etc.) to the optical center 302 of the lens 160. The motion information may comprise the frequency 232a-232n and the amplitude 234 of the vibration 230 for the roll rotation 220, the frequency 238a-238n and the amplitude 240 of the vibration 236 for the pitch rotation 222 and/or the frequency 244a-244n and the amplitude 246 of the vibration 242 for the yaw rotation 224 provided by the motion information signal M_INFO.

The extra compensation (e.g., r) may be determined from an intrinsic behavior of the lens and/or the motion information. The total compensation for EIS may comprise a variable ratio of the extra compensation to the image stabilization compensation. The ratio may be different at different zoom values and/or different distances. As the zoom value increases, the ratio of the amount of extra compensation with respect to the image stabilization compensation may increase (e.g., increase non-linearly). The extra compensation may comprise a combination of several factors. One factor may be a zoom value (e.g., provided by the signal OZR). Another factor may be an additional pixel shift from the ideal geometry distortion projection due to the optical path resulting from the effect of the zoom (e.g., provided by the signal PSHIFT). Yet another factor may be a distance from the point (e.g., the pixel location) to the optical center 302 of the lens 160 (e.g., provided by the signal D_OPTC). Still another factor may be the movement information (e.g., provided by the signal M_INFO). The amount of contribution of each of the factors may be determined by the calibration values.

Figure 8:
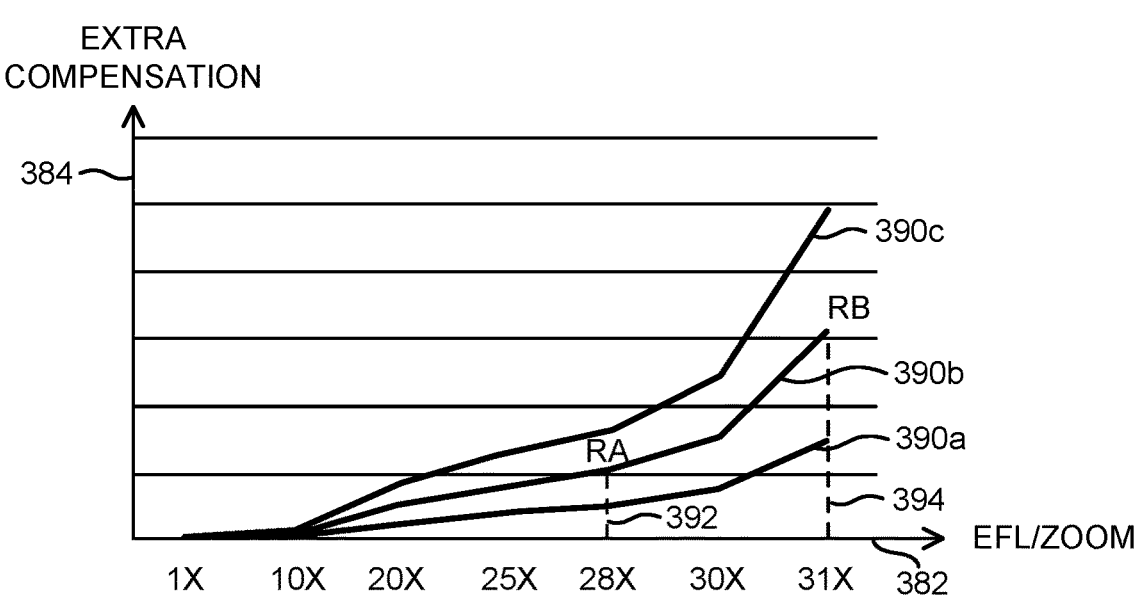
FIG. 8 is a diagram illustrating a graph of extra compensation for a range of optical zoom ratios.

Referring to FIG. 8, a diagram illustrating a graph of extra compensation for a range of optical zoom ratios is shown. A graph 380 is shown. The graph 380 may comprise an axis 382 and an axis 384. The axis 382 may be an X-axis. The X-axis 382 may illustrate an amount of EFL and/or zoom ratio. The axis 384 may be a Y-axis. The Y-axis 384 may represent an amount of extra compensation (e.g., r) for the electronic image stabilization performed.

The graph 380 may comprise curves 390a-390c. The curves 390a-390c may represent the extra compensation determined for different types of zoom lenses (e.g., zoom lens A, zoom lens B, and zoom lens C). The extra compensation curves 390a-390c may represent a padding value of different zoom lenses (e.g., a padding for the extra compensation to be added to the image stabilization compensation). In one example, the zoom lenses A-C may represent various large optical zoom lens products (e.g., a Thorlab's zoom lens, a Navitar zoom lens, a Opteka zoom lens, a Canon EF-S55 lens, etc.). The particular lenses implemented may be varied according to the design criteria of a particular implementation.

Each of the extra compensation curves 390a-390c may increase at different rates depending on the intrinsic properties of the zoom lenses. For example, extra compensation curve 390c for the zoom lens C may have the highest values of extra compensation and the extra compensation curve 390a for the zoom lens A may have the lowest values of extra compensation. Generally, at low values of the optical zoom 202 (e.g., a low range of optical zoom ratios) the amount of the extra compensation of the extra compensation curves 390a-390c may be negligible. In the example shown, the negligible values for the extra compensation curves may correspond to zoom values of approximately 10× zoom. However, there may not be a particular threshold zoom value for every lens where the contribution from the extra compensation is negligible (e.g., some lenses may a larger amount of extra compensation at 10X zoom and lower that may not be negligible). Generally, the negligible contribution to the extra compensation may be a comparison with respect to the amount of compensation provided by the image stabilization compensation (e.g., from the general lens projection function). Generally, each zoom ratio may have a particular compensation factor. Each lens may have a unique extra compensation curve (e.g., even if some of the extra compensation values may overlap with extra compensation curves for other types of zoom lenses).

In one example, the zoom lens curve 390b may correspond to the curve 358 in association with FIG. 7. A dashed line 392 and a dashed line 394 are shown. The dashed line 392 may represent an amount of extra compensation (e.g., RA) for the zoom lens B at a zoom ratio of 28×. Similarly, the dashed line 394 may represent an amount of extra compensation (e.g., RB) for the zoom lens B at a zoom ratio of 31×. For example, the dashed line 392 may correspond to the RA value between the point 360a and the point 362a shown in association with FIG. 7, and the dashed line 394 may correspond to the RB value between the point 360b and the point 362b shown in association with FIG. 7.

Generally, for a small zoom ratio, the extra compensation factor may be very small (e.g., negligible, close to zero, relatively small compared to the image stabilization compensation value, etc.). Generally, for larger zoom ratios, the extra compensation factor may be a more prominent value in the final (or total) compensation. For example, as the optical zoom ratio 202 increases, the extra compensation may be the dominant factor in the EIS correction. In one example, larger zoom ratios may be at values larger than 10×. In the example shown in association with FIG. 7, the extra compensation may begin to dominate the total compensation at approximately 31× zoom. While the graph 380 shows an upper zoom ratio value of 31×, the extra compensation (e.g., and the equation EQ4) may be applicable to even larger zoom ratios. The extra compensation curves 390a-390c may increase non-linearly. In one example, the increase of the extra compensation curves 390a-390c may be an exponential function (e.g., $e^x$). In another example, the increase of the extra compensation curves 390a-390c may be a power function or cubic function (e.g., $x^2$, $x^3$). The type of non-linear increase of the extra compensation curves 390a-390c may be varied according to the design criteria of a particular implementation.

Generally, the extra compensation may provide an additional amount of compensation that may be related to the amount of the optical zoom 202 and/or the intrinsic characteristics of the lens 160. For example, the curves 390a-390c may represent the additional compensation for different lens types. The curves 390a-390c may be represented by a fitted line up to a particular value of the optical zoom 202. In one example, a slope of 1 for the fitted line may be considered a threshold for a large amount of compensation or a low amount of compensation. For example, when the slope of a fitted line for one of the curves 390a-390c is above 1, then the amount of compensation may be considered large or high. In another example, when the slope of a fitted line for one of the curves 390a-390c is below 1, then the amount of compensation may be considered small or low. The particular slope value that may be used as a threshold for a low or high amount of compensation may be varied according to the design criteria of a particular implementation.

Figure 9:
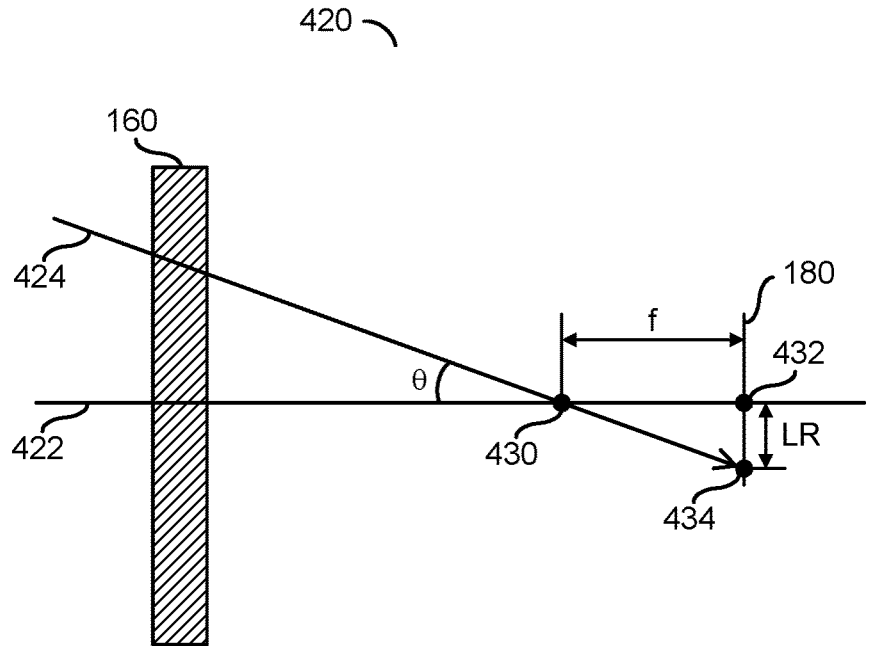
FIG. 9 is a diagram illustrating an incident light input at an image sensor.

Referring to FIG. 9, a diagram illustrating an incident light input at an image sensor is shown. An incident light scenario 420 is shown. The incident light scenario 420 may comprise the lens 160, the image sensor 180, a line 422 and a line 424. The line 422 may represent an optical center of the lens 160. For example, the sensor 180 may be located behind the lens 160 and centered at the optical center 422 of the lens 160. The line 424 may represent an incoming light ray (e.g., the signal LIN).

A point 430, a point 432 and a point 434 are shown. The point 430 may be a location that the incident light ray 424 intersects with the optical center of the lens 160 (e.g., a location behind the lens 160). The point 432 may represent a location of the optical center of the lens 160 on the image sensor 180. The point 434 may represent a location that the incident light ray 424 is detected on the image sensor 180. An angle (e.g., Θ) is shown. The angle Θ may represent an incident angle of the light ray 424 with respect to the optical center 422 of the lens 160. A value f is shown. The value f may be a distance between the image sensor 180 and the intersection point 430. A value LR is shown. The value LR may be a distance between the optical center point 432 at the image sensor 180 and the point 432. The value LR may be presented to the extra compensation module 284 as the signal D_OPTC.

The value f may be in a pixel unit. The value f may be determined in response to the CMOS sensor pixel unit size (e.g., from the image sensor 180) and EFL (e.g., the optical zoom ratio 202). The focal length f may be the distance from the intersection point 430 with the incident light ray to the image sensor 180. The value Θ may be the incident angle for each pixel of the image. For example, the value Θ may be the angle between the optical axis 422 and the light ray 424. The value LR may be a radius measurement that indicates the distance to the image center. The value LR may be a point from the optical center 422 that depends on the focal length f and the incident angle Θ. In one example, the value LR may be determined according to the equation LR=f(Θ). For example, the value LR may be the radius value in the equation EQ4. In one example, the processor 102 may calculate the value of LR and present the value of LR to the extra compensation module 284 as the signal D_OPTC.

The effective focal length (EFL) may be an attribute of the lens 160. For example, the EFL may be data available from a data sheet for each lens type that may be programmed into the memory 150. The data unit for the EFL may generally be provided in millimeters (mm). The zoom value (e.g., 1×, 2×, . . . , 40×, and greater) may describe the optical zoom 202 of the zoom lens 160 in a quantitative method. The relationship between EFL (mm) and the zoom value may be a one-to-one correspondence. Each lens vendor may define an individual relationship between EFL and zoom value due to the optical components of a camera. The focal length may describe the EFL in pixel units. The focal length may depend on a cell unit size of the camera CMOS sensor (e.g., the image sensor 180). The focal length may vary when the CMOS sensor is changed. The equation EQ4 may use the focal length f in pixel unit. The extra compensation equation EQ 4 may comprise a conversion for the pixel unit focal length.

The direction of a light ray 424 may change little after going through the lens 160 in a large optical zoom scenario. When the lens 160 is a fisheye lens and/or a wide-angle lens, the direction of the light ray 424 may change significantly. For a large optical zoom lens, the behavior may be similar to the pinhole camera model. For the pinhole camera model, the relationship between the distance LR, the focal length f and the incident angle $\Theta$ may be r=f*tan($\Theta$). A zoom lens with large EFL may have a limited field of view.

Figure 10:
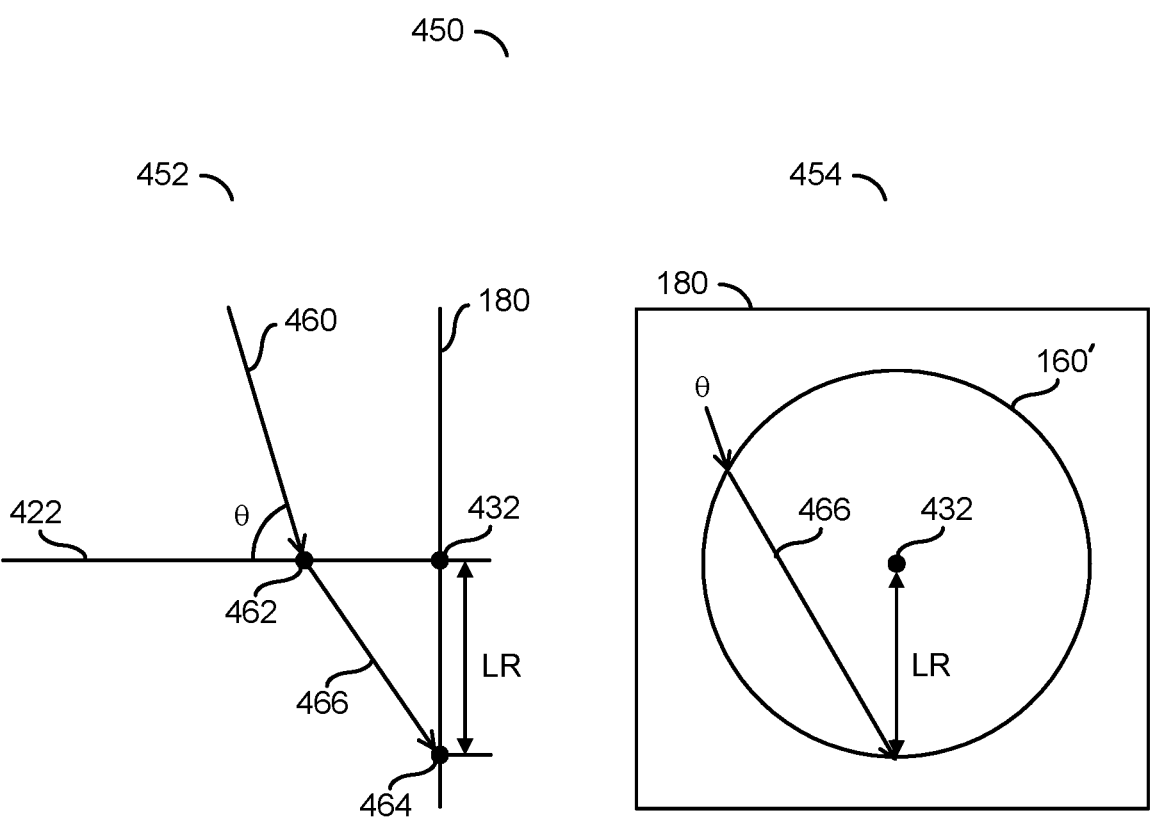
FIG. 10 is a diagram illustrating an incident light input at a wide angle lens.

Referring to FIG. 10, a diagram illustrating an incident light input at a wide-angle lens is shown. A wide-angle lens incident light scenario 450 is shown. The wide-angle lens incident light scenario 450 may comprise a side view 452 and a front view 454. The side view 452 and the front view 454 may provide an illustrative example for the wide angle lens 160'. The side view 452 may comprise the image sensor 180, the optical center line 422, the optical center intersection point 432, a line 460, a point 462 and/or a point 464. The line 460 may represent an incoming light ray (e.g., the signal LIN). The point 462 may be a location that the incident light ray 460 intersects with the optical center of the wide-angle lens 160' (e.g., a location behind the wide-angle lens 160'). The point 464 may represent a location that the incident light ray 460 is detected on the image sensor 180. The angle $\Theta$ may represent an incident angle of the light ray 460 with respect to the optical center 422 of the wide-angle lens 160'.

A line 466 is shown. The line 466 may represent a change in direction of the incident light ray 460 after passing through the wide-angle lens 160'. The value LR is shown from the optical center intersection point 432 to the point 464. The front view 454 may comprise the wide-angle lens 160', the image sensor 180, the optical center intersection point 432, the incident angle $\Theta$, the change of direction 466, and the value LR.

The angle $\Theta$ may be changed after passing through the lens 160. For example, the incoming light ray 460 is shown having the incident angle $\Theta$ at the optical center line 422. After the optical center line 422, the incoming light ray 460 may have a different angle. In a fisheye or wide-angle lens, the direction of the light ray 460 may be changed after the light ray passes through the lens 160'. In the example shown, the value LR may be larger in the wide-angle lens incident light scenario 450 than shown in the incident light scenario 420 for the standard lens 160 shown in association with FIG. 9. For the wide-angle lens 160', the general projection functions may be used for a lens model with radical distortion. For example, the equidistance function (e.g., EQ1) and/or the stereographic (e.g., EQ2) may be implemented. In another example, the look-up table 292 may be configured to map the distance LR and incident angle $\Theta$. In one example, the look-up table 292 may be configured to store the mapping values supplied in a table by the lens vendor.

Figure 11:
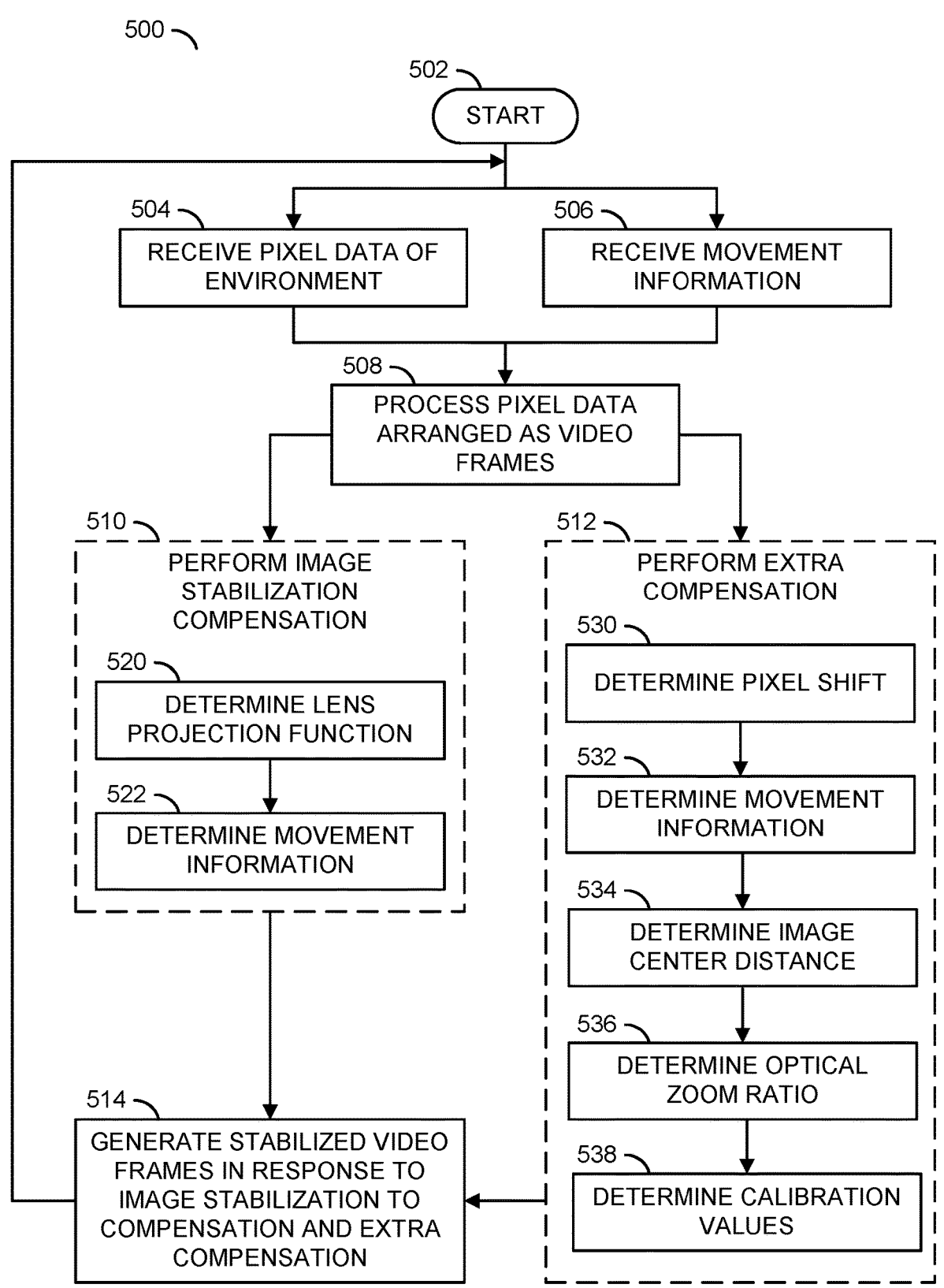
FIG. 11 is a flow diagram illustrating a method for implementing electronic image stabilization for large zoom ratio lens.

Referring to FIG. 11, a method (or process) 500 is shown. The method 500 may implement electronic image stabilization for large zoom ratio lens. The method 500 generally comprises a step (or state) 502, a step (or state) 504, a step (or state) 506, a step (or state) 508, a step (or state) 510, a step (or state) 512, and a step (or state) 514. The step 510 may further comprise a step (or state) 520, and a step (or state) 522. The step 512 may further comprise a step (or state) 530, a step (or state) 532, a step (or state) 534, a step (or state) 536, and a step (or state) 538.

The step 502 may start the method 500. Next, the method 500 may move to the steps 504 and/or 506. In an example, the steps 504-506 may be performed in parallel and/or substantially in parallel. In the step 504, the capture device 104 may receive pixel data of the environment. For example, the lens 160 may receive the light input LIN, and the image sensor 180 may convert the light into raw pixel data (e.g., the signal VIDEO). Next, the method 500 may move to the step 508. In the step 506, the IMU 106 may receive movement information. For example, the gyroscope 186 may measure the movement MTN of the camera system 100 and the IMU 106 may convert the measurement to the movement information (e.g., the signal M_INFO). Next, the method 500 may move to the step 508. In the step 508, the processor 102 may process the pixel data arranged as video frames. In some embodiments, the processor 102 may perform other operations on the pixel data arranged as video frames in addition to the EIS (e.g., perform computer vision operations, calculate depth data, determine white balance, etc.). Next, the method 500 may move to the step 510 and/or the step 512. The step 510 may implement the image stabilization compensation. The step 512 may implement the extra compensation. The steps 510-512 may be determined in parallel and/or substantially in parallel. In some embodiments, the step 510 may be performed first (e.g., to determine the additional pixel shift that may be used for the extra compensation). The particular order and/or the amount of parallelization of the image stabilization compensation step 510 and/or the extra compensation step 512 may be varied according to the design criteria of a particular implementation.

The image stabilization compensation step 510 may comprise the step 520 and the step 522. In the step 520, the image stabilization compensation module 282 may determine the lens projection function. In an example, the lens projection function may comprise one of the equations EQ1-EQ3. Other lens projection functions may be implemented. Next, in the step 522, the image stabilization compensation module 282 may determine the movement information. For example, the movement information may be read from the IMU 106 in the signal M_INFO. In one example, the LUT 292 may be accessed to provide the result of the lens projection function for a particular amount of movement and/or amount of zoom. In some embodiments, an additional step (not shown) may be performed to determine the amount of pixel shift for the lens 160 (e.g., to generate the signal PSHIFT). Next, the method 500 may move to the step 514.

The extra compensation step 512 may comprise the steps 530-538. In the step 530, the extra compensation module 284 may determine the amount of pixel shift. In an example, the pixel shift may be read from the image stabilization compensation module 282 (e.g., in the signal PSHIFT). Next, in the step 532, the extra compensation module 284 may determine the movement information (e.g., read the signal M_INFO from the IMU 106). Next, in the step 534, the extra compensation module 284 may determine the image center distance from the lens 160. For example, the processor 102 may analyze the video data to determine the image center distance from the lens 160 and provide the signal D_OPTC to the extra compensation module 284. Next, the zoom driver 290 may determine the optical zoom ratio signal OZR. Next, in the step 538, the extra compensation module 284 may determine the calibration values based on the pixel shift, the movement information, the image center distance and/or the optical zoom ratio. Next, the method 500 may move to the step 514.

The sequence of the steps 520-522 in the image stabilization compensation step 510 and the sequence of steps 530-538 in the extra compensation step 512 are shown as one example. In one example, the pixel shift step 530 may be performed after the motion information step 532. In another example, the motion information step 522 may be performed before the lens projection function step 520. The particular order of the steps performed may be varied according to the design criteria of a particular implementation.

In the step 514, the processor 102 may generate stabilized video frames in response to the image stabilization compensation and the extra compensation. For example, the warp table data may be presented to the warp engine 281, and the signal VIDOUT may be generated. Next, the method 500 may return to the steps 504-506.

Figure 12:
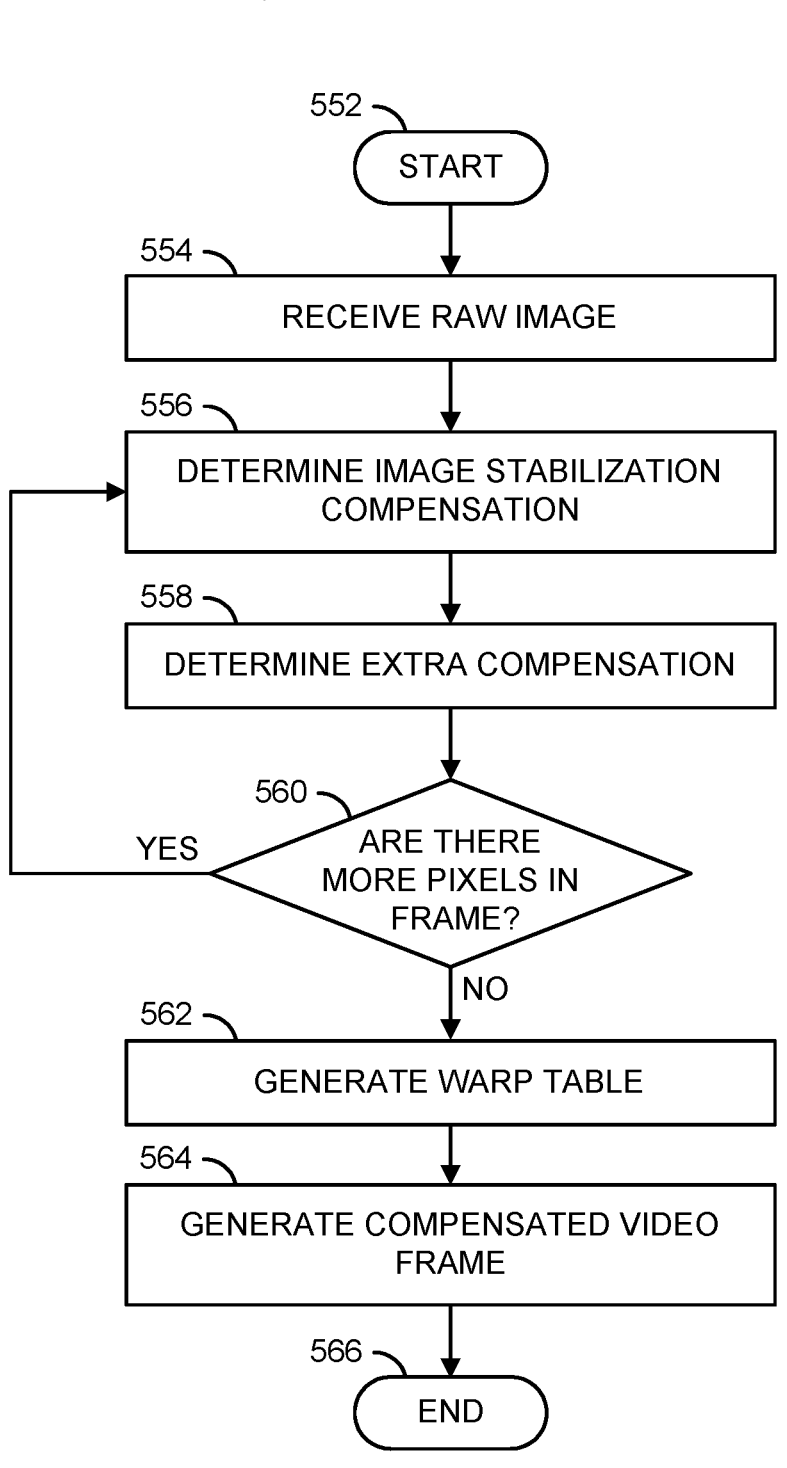
FIG. 12 is a flow diagram illustrating a method for generating a warp table from raw input data.

Referring to FIG. 12, a method (or process) 550 is shown. The method 550 may generate a warp table from raw input data. The method 550 generally comprises a step (or state) 552, a step (or state) 554, a step (or state) 556, a step (or state) 558, a decision step (or state) 560, a step (or state) 562, a step (or state) 564, and a step (or state) 566.

The step 552 may start the method 550. In the step 554, the processor 102 and/or the warp engine 281 may receive the raw image data. The raw image data may be provided by the signal VIDEO. In the step 556, the image stabilization compensation module 282 may determine the image stabilization compensation (e.g., the signal ISC). Next, in the step 558, the extra compensation module 284 may determine the extra compensation (e.g., the signal EC). Next, the method 550 may move to the decision step 560.

In the decision step 560, the processor 102 may determine whether there are more pixels in the video frame. Generally, the image stabilization compensation ISC and the extra compensation EC may be calculated for each of the pixels in the raw video data. For example, different amounts of padding may be determined for each pixel location, as shown in association with FIG. 6. Larger amounts of padding for the values of ISC and EC may be calculated the farther away the pixel location is from the optical center 302. If there are more pixels in the raw video frame, then the method 550 may return to the step 556 (e.g., determine the image stabilization compensation and the extra compensation for the remaining pixels). If there are no more pixels to calculate compensation data for in the raw image data, then the method 550 may to the step 562.

In the step 562, the adder 286 may combine the image stabilization compensation ISC and the extra compensation EC to determine the total compensation FC. The EIS library 288 may determine the warp table data for the compensation. The EIS library 288 may present the warp table data signal WT to the warp engine 281. Next, in the step 564, the warp engine 281 may generate the compensated video frames (e.g., the signal VIDOUT). Next, the method 550 may move to the step 566. The step 566 may end the method 550.

Referring to FIG. 13, a method (or process) 600 is shown. The method 600 may determine movement information for image stabilization compensation and extra compensation. The method 600 generally comprises a step (or state) 602, a step (or state) 604, a decision step (or state) 606, a step (or state) 608, a step (or state) 610, a step (or state) 612, a step (or state) 614, a step (or state) 616, and a step (or state) 618.

The step 602 may start the method 600. In the step 604, the motion sensor 186 (e.g., the gyroscope) may monitor the camera system 100 for external vibration. Next, the method 600 may move to the decision step 606. In the decision step 606, the motion sensor 186 may determine whether a change in vibration has been detected. For example, the motion may comprise a combination of the vibration 230, the vibration 236 and/or the vibration 242. If the vibration change has not been detected, then the method 600 may move to the step 612 (e.g., a previous value of vibration may be used). If the vibration change has been detected, then the method 600 may move to the step 608.

In the step 608, the IMU 106 may capture the vibration from the motion sensor 186 (e.g., the motion MTN). Next, in the step 610, the IMU 106 may convert the vibration to an amplitude and frequency in the roll direction 220, the pitch direction 222 and/or the yaw direction 224. For example, the vibration may be converted to the frequency $232a$-$232n$ and the amplitude 234 in the roll direction 220, the frequency $238a$-$238n$ and the amplitude 240 in the pitch direction 222 and/or the frequency $244a$-$244n$ and amplitude 246 in the yaw direction 224. Next, the method 600 may move to the step 612.

In the step 612, the image stabilization compensation module 282 may look up the geometry distortion compensation in the look up table 292. For example, the look up table 292 may comprise the values for the lens projection function for a particular angle and distance from the point to the center of the lens 160. Next, in the step 614, the image stabilization compensation module 282 and/or the extra compensation module 284 may receive the optical zoom ratio OZR. In the step 616, the extra compensation module 284 may determine the additional pixel shift from the ideal geometry distortion due to the optical path (e.g., the signal PSHIFT received from the image stabilization compensation module 282) and the distance from the center of the lens 160 (e.g., the signal D_OPTC corresponding to the distance LR shown in association with FIGS. 9-10). Next, in the step 618, the processor 102 may determine the total electronic image stabilization. For example, the adder 286 may determine the signal FC. The signal FC may be analyzed by the EIS library module 288 to determine the warp table data WT. Next, the method 600 may return to the step 604.

Figure 14:
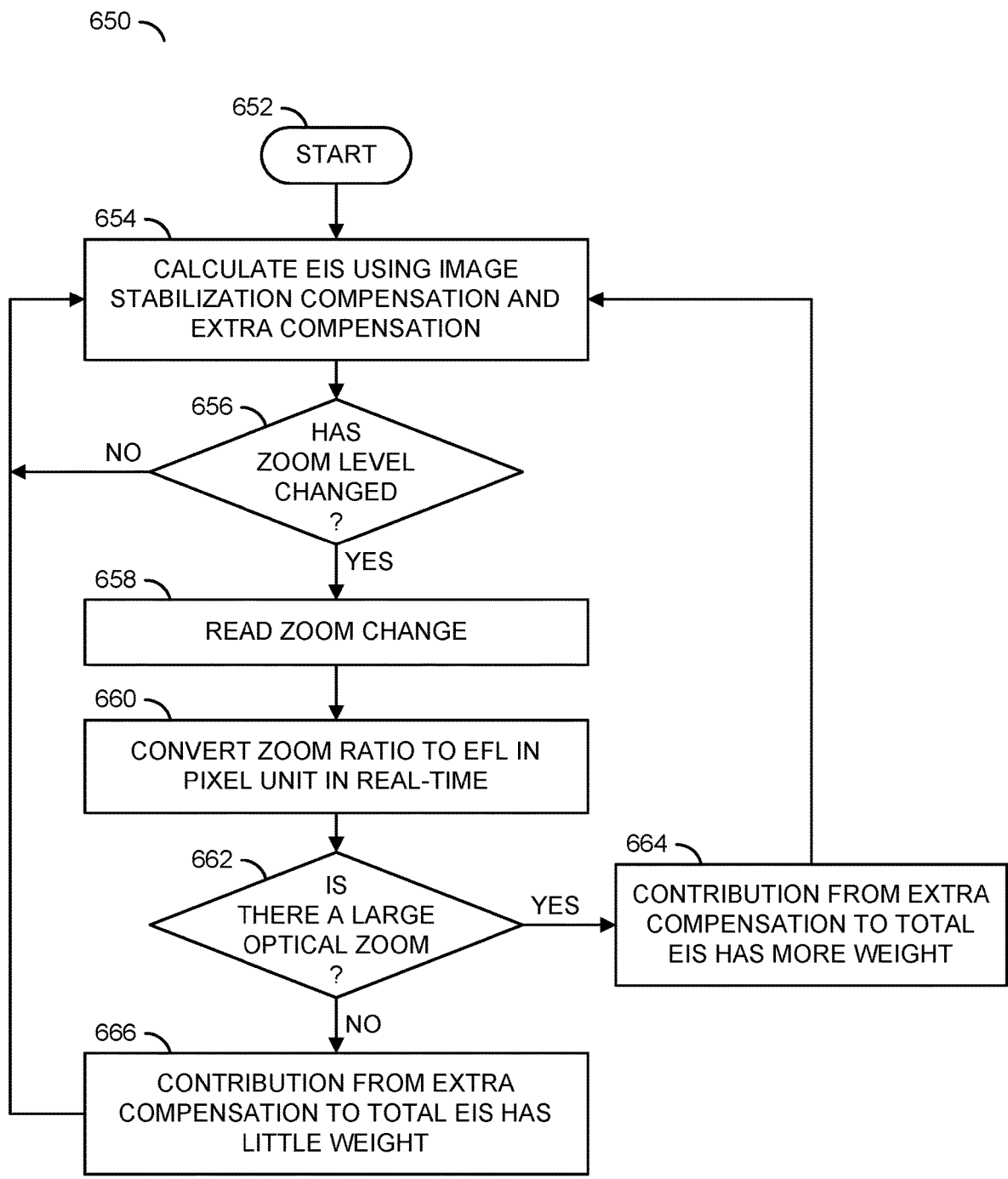
FIG. 14 is a flow diagram illustrating a method for determining a contribution of extra compensation to EIS based on an optical zoom.

Referring to FIG. 14, a method (or process) 650 is shown. The method 650 may determine a contribution of extra compensation to EIS based on an optical zoom. The method 650 generally comprises a step (or state) 652, a step (or state) 654, a decision step (or state) 656, a step (or state) 658, a step (or state) 660, a decision step (or state) 662, a step (or state) 664, and a step (or state) 666.

The step 652 may start the method 650. In the step 654, the EIS library module 288 may calculate the EIS using the image stabilization compensation and the extra compensation. Next, the method 650 may move to the decision step 656. In the decision step 656, the zoom driver 290 may determine whether the zoom level has changed. For example, the zoom lens motor 294 may adjust the zoom level of the lens 160 and present the signal OZR_M to the processor 102. If no zoom change has occurred, then the method 650 may return to the step 654. If the zoom change has occurred, then the method 650 may move to the step 658. In the step 658, the zoom driver 290 may read the zoom change. For example, the zoom driver 290 may read the signal OZR_M generated by the zoom lens motor 294. Next, in the step 660, the zoom driver 290 may convert the zoom ratio to the EFL in a pixel unit value in real-time. Converting the zoom ratio to the pixel unit EFL value in real-time may enable the image stabilization compensation module 282 and/or the extra compensation module 284 to react to changes in zoom for image stabilization as the zoom change occurs. Next, the method 650 may move to the decision step 662.

In the decision step 662, the extra compensation module 284 may determine whether there is a large amount of optical zoom. In one example, the large amount of optical zoom may be a 10× zoom or greater. In another example, the large amount of optical zoom may be 20× or greater. In yet another example, the large amount of optical zoom may be when the equation EQ4 results in the extra compensation providing more than a negligible amount of contribution to the total amount of compensation. If the optical zoom is large, then the method 650 may move to the step 664. In the step 664, the contribution from the extra compensation EC may have a larger percentage of the total EIS. For example, the EC may be equal to the ISC and/or greater than the ISC. Next, the method 650 may return to the step 654. In the decision step 662, if the optical zoom is not large, then the method 650 may move to the step 666. In the step 666, the contribution from the extra compensation EC to the total EIS may have a relatively small percentage. In one example, the EC may be less than the ISC. In another example, the EC may be negligible (e.g., a near zero value). Next, the method 650 may return to the step 654.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an interface configured to receive (i) pixel data of an environment and (ii) movement information about said apparatus; and a processor configured to (i) process said pixel data arranged as video frames, (ii) implement an image stabilization compensation in response to (a) a lens projection function and (b) said movement information, (iii) perform an extra compensation in response to calibration values, and (iv) generate stabilized video frames in response to (a) said image stabilization compensation, (b) said extra compensation and (c) said video frames, wherein said calibration values are determined in response to (a) a pixel shift, (b) said movement information, (c) an image center distance, and (d) an optical zoom ratio of a lens.

2. The apparatus according to claim 1, wherein an amount of electronic image stabilization applied to said video frames to generate said stabilized video frames comprises a first amount of contribution from said image stabilization and a second amount of contribution from said extra compensation.

3. The apparatus according to claim 2, wherein said second amount of contribution to said electronic image stabilization by said extra compensation is a low value compared to said first amount of contribution to said electronic image stabilization by said image stabilization compensation when said optical zoom ratio is within a low range of optical zoom ratios.

4. The apparatus according to claim 2, wherein said second amount of contribution to said electronic image stabilization by said extra compensation compared to said first amount of contribution to said electronic image stabilization by said image stabilization compensation increases nonlinearly as said optical zoom ratio increases above a large zoom ratio value.

5. The apparatus according to claim 1, wherein (i) said extra compensation is determined at every value of said optical zoom ratio and (ii) said extra compensation increases as said optical zoom ratio increases.

6. The apparatus according to claim 1, wherein said extra compensation increases as an effective focal length increases.

7. The apparatus according to claim 1, wherein said movement information comprises a combination of a vibration in a pitch direction, a vibration in a roll direction, and a vibration in a yaw direction.

8. The apparatus according to claim 7, wherein each of said vibration in said pitch direction, said vibration in said roll direction, and said vibration in a yaw direction comprises a respective vibration frequency and a vibration amplitude.

9. The apparatus according to claim 1, wherein external vibration of said apparatus is determined by a gyroscope and said movement information is generated by an inertial measurement unit in response to said external vibration.

10. The apparatus according to claim 1, wherein said stabilized video frames are generated in response to electronic image stabilization for a large zoom ratio lens.

11. The apparatus according to claim 1, wherein said lens projection function is configured to determine a lens geometry distortion in response to at least one of f-theta, tailored distortion and a pin hole model.

12. The apparatus according to claim 1, wherein said lens projection function is determined using a look-up table configured to describe a geometry distortion compensation at different angles and distances from a point to a center of said lens.

13. The apparatus according to claim 1, wherein said calibration values comprise a first scalar value for said pixel shift and said optical zoom ratio, a second scalar value for said image center distance, and a third scalar value for said movement information.

14. The apparatus according to claim 1, wherein for a first point that is located at a greater distance from an optical center of said lens than a second point (i) a first value of said image stabilization compensation corresponding to said first point is greater than a second value of said image stabilization compensation corresponding to said second point and (ii) a third value of said extra compensation corresponding to said first point is greater than a fourth value of said extra compensation corresponding to said second point.

15. The apparatus according to claim 1, wherein a total amount of compensation for said stabilized video frames is a combination of said image stabilization compensation and said extra compensation.

16. The apparatus according to claim 15, wherein said total amount of compensation is determined according to an equation: Final_comp=R[k1*f(EFL, zoom), k2*radius, k3*frequency].

17. The apparatus according to claim 15, wherein (i) said processor further comprises an electronic image stabilization library and (ii) said electronic image stabilization library is configured to calculate a warp table in response to said total amount of compensation.

18. The apparatus according to claim 17, wherein (i) said warp table is presented to a warp engine and (ii) said warp engine is configured to generate said stabilized video frames in response to said warp table and said video frames.

19. The apparatus according to claim 18, wherein said warp engine is implemented on an integrated digital signal processor separate from said processor.

* * * * *